(12) United States Patent
Sarkar et al.

(10) Patent No.: US 12,140,745 B2
(45) Date of Patent: *Nov. 12, 2024

(54) METHOD AND SYSTEM TO DETECT SUBSTRATE PLACEMENT ACCURACY

(71) Applicant: Ventana Medical Systems, Inc., Tucson, AZ (US)

(72) Inventors: Anindya Sarkar, Milpitas, CA (US); Chibuya Siame, Marana, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/104,363

(22) Filed: Feb. 1, 2023

(65) Prior Publication Data
US 2023/0176354 A1    Jun. 8, 2023

Related U.S. Application Data

(63) Continuation of application No. 17/176,515, filed on Feb. 16, 2021, now Pat. No. 11,600,016, which is a
(Continued)

(51) Int. Cl.
*G06T 7/73* (2017.01)
*G02B 21/26* (2006.01)
(Continued)

(52) U.S. Cl.
CPC ............. *G02B 21/34* (2013.01); *G02B 21/26* (2013.01); *G02B 21/365* (2013.01); *G06T 7/13* (2017.01);
(Continued)

(58) Field of Classification Search
CPC ... G06T 7/73; G06T 7/13; G06T 2207/10056; G02B 21/26; G02B 21/34; G02B 21/365
See application file for complete search history.

(56) References Cited

U.S. PATENT DOCUMENTS

2004/0218263 A1    11/2004  Brugal
2005/0111093 A1*    5/2005  Bonaventura .......... G02B 21/26
                                                    359/393
(Continued)

FOREIGN PATENT DOCUMENTS

CN          1534273 A      10/2004
CN        202771098 U       3/2013
(Continued)

OTHER PUBLICATIONS

Molecular expression, "Microscope Stages" https://micro.magnet.fsu.edu/primer/anatomy/stage.htmlwiththecorrespondingwaybackarchivedateof01/15/2015andtheweblinkhttps://Aveb.archive.org/web/20150115025636/https://micro.magnet.fsu.edu/primer/anatomy/stage.html.*
(Continued)

*Primary Examiner* — James T Boylan
(74) *Attorney, Agent, or Firm* — Charney IP Law LLC; Thomas M. Finetti

(57) ABSTRACT

A method and system for measuring the alignment between a substrate and a platform upon which it is disposed by using image processing algorithms are described herein. These algorithms automate the detection of edges of a microscope slide and the platform in a digital image. A reference line pattern in an image of the platform can be used to detect platform edges based on a computed location of the reference line pattern in the image.

6 Claims, 11 Drawing Sheets

Related U.S. Application Data continuation of application No. 16/415,226, filed on May 17, 2019, now Pat. No. 10,957,071, which is a continuation of application No. PCT/EP2017/079447, filed on Nov. 16, 2017.

(60) Provisional application No. 62/423,859, filed on Nov. 18, 2016.

(51) Int. Cl.
   *G02B 21/34* (2006.01)
   *G02B 21/36* (2006.01)
   *G06T 7/13* (2017.01)
   *G06V 10/24* (2022.01)
   *G06V 20/69* (2022.01)

(52) U.S. Cl.
   CPC .............. *G06T 7/73* (2017.01); *G06V 10/245* (2022.01); *G06V 20/69* (2022.01); *G06T 2207/10056* (2013.01)

(56) References Cited

U.S. PATENT DOCUMENTS

| | | | |
|---|---|---|---|
| 2007/0014467 A1 | 1/2007 | Bryll | |
| 2007/0216892 A1 | 9/2007 | Eidelberg | |
| 2007/0282506 A1* | 12/2007 | Breed | B60N 2/028 701/45 |
| 2012/0099852 A1* | 4/2012 | Staker | H04N 7/18 348/E17.001 |
| 2013/0083964 A1* | 4/2013 | Morris | G01S 7/4808 382/103 |
| 2014/0252639 A1 | 9/2014 | Okada et al. | |
| 2014/0294284 A1* | 10/2014 | Bryll | G06T 7/13 382/152 |
| 2016/0147056 A1* | 5/2016 | Corwin | G02B 27/32 359/391 |
| 2017/0293817 A1 | 10/2017 | Bonch-Osmolovsky | |
| 2018/0149562 A1 | 5/2018 | Kawano | |
| 2019/0019728 A1* | 1/2019 | Fitzgerald | H01L 21/78 |
| 2019/0125289 A1* | 5/2019 | Van Es | A61B 6/547 |

FOREIGN PATENT DOCUMENTS

| | | | |
|---|---|---|---|
| JP | 02-128283 A | 5/1990 | |
| JP | 2004-006372 A | 1/2004 | |
| JP | 2007-026446 A | 2/2007 | |
| JP | 2010-533299 A | 10/2010 | |
| JP | 2014-174288 A | 9/2014 | |
| JP | 2016-503169 A | 2/2016 | |
| JP | 2016-110043 A | 6/2016 | |
| WO | 1996009610 A1 | 3/1996 | |
| WO | 2009/009419 A2 | 1/2009 | |
| WO | 2014105747 A2 | 7/2014 | |
| WO | 2016079285 A1 | 5/2016 | |
| WO | 2016/092815 A2 | 6/2016 | |

OTHER PUBLICATIONS

Website (https://www.azonano.com/equipment-details.aspx?EquipID=578), Manual Prcision XY Microscope Stage, M-545.2M from PI, using internet archive wayback machine date of Sep. 5, 2015 (Year: 2015).

Hough-Transformation NPL (details provided in IDS dated May 17, 2019), Feb. 26, 2014.

International Search Report and Written Opinion, dated Nov. 16, 2017 for PCT/EP2017/079447.

* cited by examiner

METHOD AND SYSTEM TO DETECT SUBSTRATE PLACEMENT ACCURACY

CROSS-REFERENCE TO RELATED APPLICATIONS

This application is a continuation of U.S. patent application Ser. No. 17/176,515 filed on Feb. 16, 2021, which application is a continuation of U.S. patent application Ser. No. 16/415,226 filed on May 17, 2019, which application is a continuation of International Patent Application No. PCT/EP2017/079447, filed Nov. 16, 2017, which claims the benefit and priority of U.S. Provisional Patent Application No. 62/423,859, filed Nov. 18, 2016, each of which are incorporated by reference herein in their entireties.

FIELD OF THE INVENTION

A method and system are disclosed for detecting substrate placement accuracy, and in particular for detecting placement accuracy of microscope slides in automated slide staining instruments and slide imaging instruments.

BACKGROUND

Inconsistent placement of a substrate onto a platform for automated treatment can lead to inconsistent processing of the substrate, particularly where application of reagents to the substrate depends upon the position of the substrate in order to ensure that reagents are applied to the correct location(s), and that they remain there or are conveyed away appropriately. For example, when microscope slides bearing biological samples are treated for microscopic analysis, improper positioning of the microscope slide on or in a slide staining platform (such as a heating element or a treatment chamber) may lead to fluid dispense and removal errors, or movement of fluid away from the sample (such as by wicking). If reagents are not properly removed between the steps of a staining protocol, or reagent is not in contact with the sample during a particular step, the entire staining protocol may be altered and render the slide unreadable by a pathologist. Another context where substrate placement is important is where microscope slides are placed on a platform (such as a stage) for imaging of the stained biological samples thereon. In either case, improper positioning can lead to inconsistent or invalid analysis results.

SUMMARY

An automated method and system are disclosed for measuring the alignment between a substrate and a platform upon which the substrate is disposed. In one embodiment, a transparent glass microscope slide bearing a biological sample is placed on a processing platform for one or more slide treatment operations.

For example, based on imaged features of the slide and images of features of a slide processing platform supporting the slide, a slide misalignment condition can be detected, by comparing features extracted from the image to a pre-determined cutoff values If the condition exceeds or falls below the cutoff, as the case may be, an error is detected. The detected error can be communicated to a user and/or the slide can be automatically repositioned and re-measured for alignment. The alignment detection and slide repositioning and re-measurement process can be repeated one or more times, for example, up to a pre-determined number of times, before a failure is indicated and the process/system is halted for inspection and/or repair.

In a more particular embodiment, at least a portion of an image of the slide processing platform is obtained through a transparent substrate such as a glass or plastic microscope slide. In an even more particular embodiment, the slide processing platform includes at least one feature of known length and/or orientation that can be imaged through the substrate and upon which the slide alignment condition can be calculated.

Any feature or combination of features described herein are included within the scope of the method for detecting slide placement accuracy for medical device instruments provided that the features included in any such combination are not mutually inconsistent as will be apparent from the context, this specification, and the knowledge of one of ordinary skill in the art. Additional advantages and aspects of the method for detecting slide placement accuracy for medical device instruments are apparent in the following detailed description and claims.

In some embodiments, the platform is comprised of a horizontal edge and a vertical edge and the microscope slide is comprised of a slide horizontal edge and a slide vertical edge that connect to form a right-angled corner. Further comprising the platform is a reference line pattern joining the vertical and horizontal edges of the platform such that the right-angled corner of the microscope slide extends beyond the reference line pattern. From an image analysis perspective, potential lighting variations in platform images may lead to intensity variations. A simple threshold-based method cannot locate the aforementioned pairs of edges. The disclosed image analysis based solution correctly identifies the reference line pattern, while capturing the slide edges. Detecting the reference line pattern is helpful to the remainder of the image analysis solution, where the horizontal and vertical lines representing the platform edges can subsequently be accurately determined based on the initially computed location of the reference line segment. If a misalignment is detected, then the user is notified. Experimental results show that the detected horizontal and vertical edges correspond very closely to the lines picked up by visual inspection.

Also disclosed is a system for detecting misalignment of a substrate (such as a microscope slide) placed on a platform (such as a heating or cooling platform) and a slide placement mechanism for automatically placing a slide onto the platform.

BRIEF DESCRIPTION OF THE DRAWINGS

The features and advantages of the method for detecting slide placement accuracy for medical device instruments will become apparent from a consideration of the following detailed description presented in connection with the accompanying drawings in which.

DETAILED DESCRIPTION

Further features and aspects of the disclosed system and method are described in the exemplary embodiments that follow.

Figure 1A:
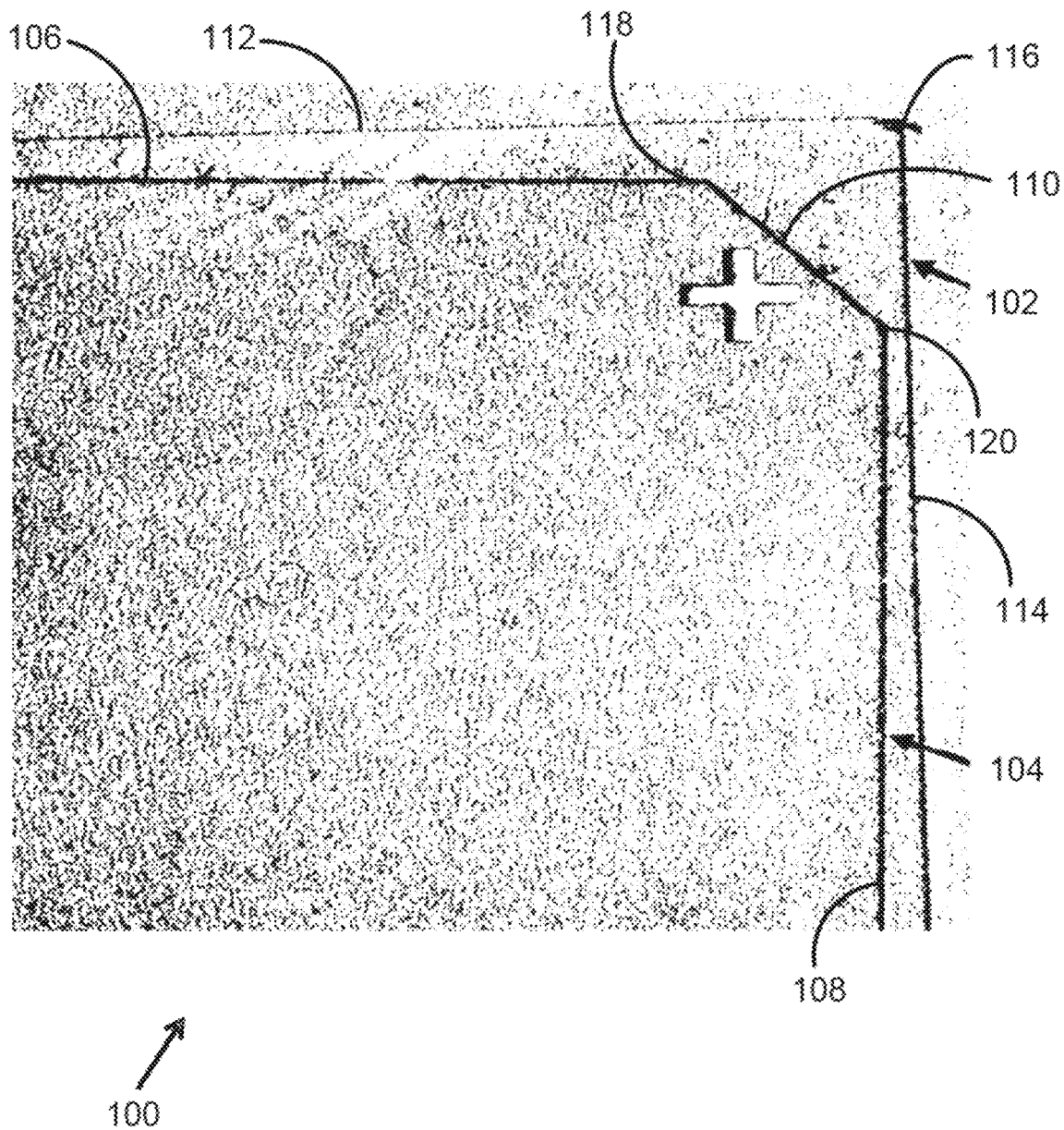
FIG. 1A shows a slide placement image.
Figure 1B:
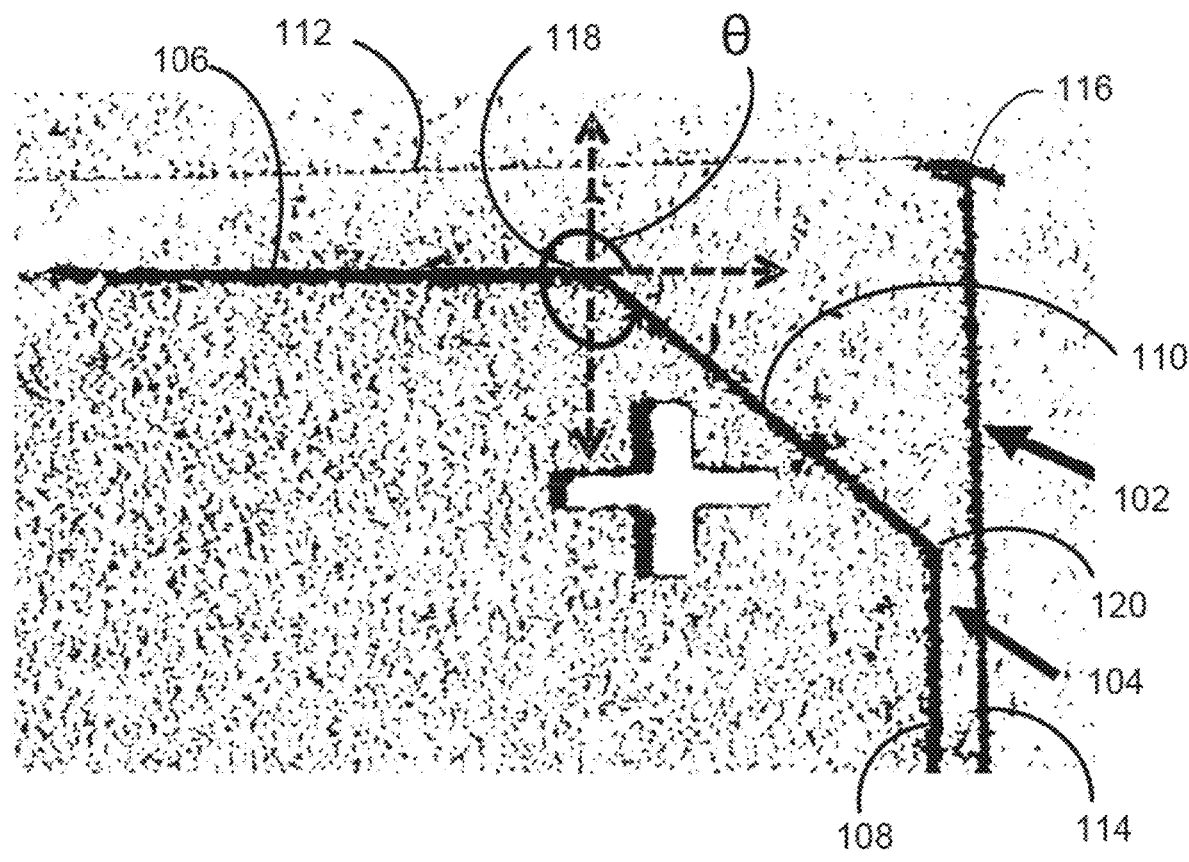
FIG. 1B shows the slide placement image zoomed in to demonstrate the angle, θ, that the reference line pattern makes with the positive x-axis of the x-y coordinate plane of the image.
Figure 2:
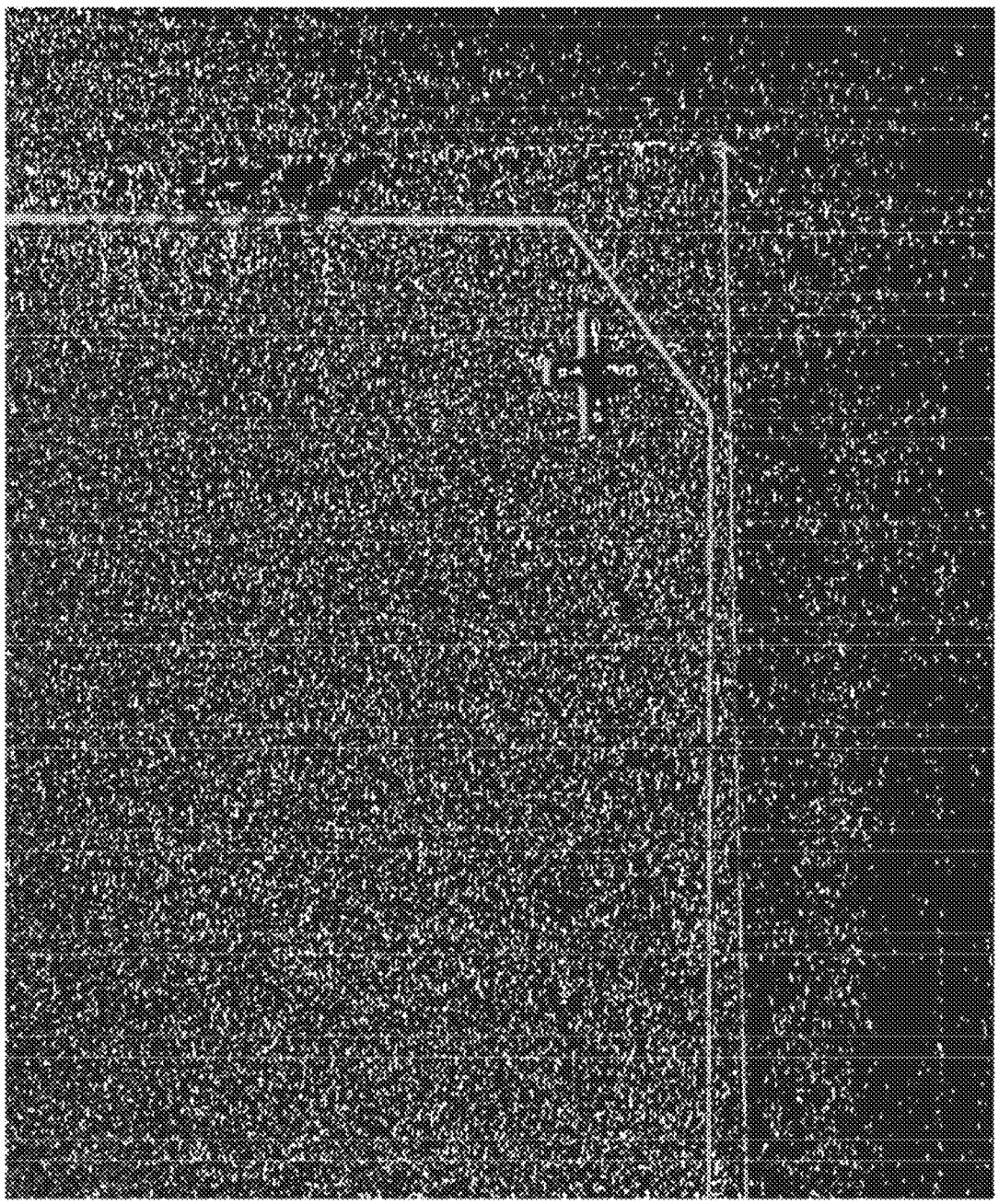
FIG. 2 is an image of the inverse grayscale image where the diagonal line segment and other salient horizontal and vertical lines show up as white, i.e. the corresponding pixel magnitudes (intensities) are high while they show up black in the original RGB image (i.e. the grayscale values are near zero).
Figure 3:
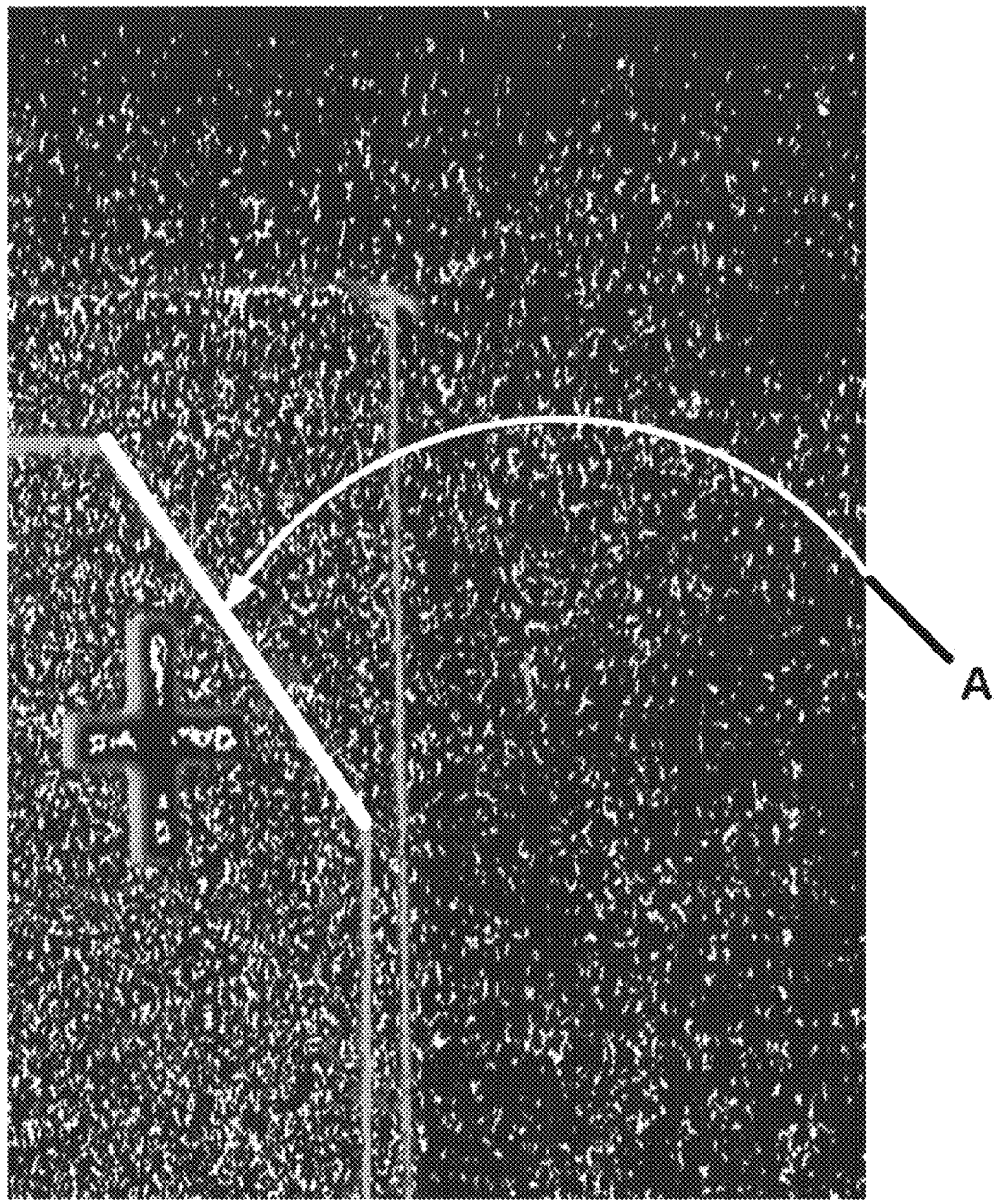
FIG. 3 shows the detection (A) of the diagonal line segment according to Case 1 as described herein.
Figure 4:
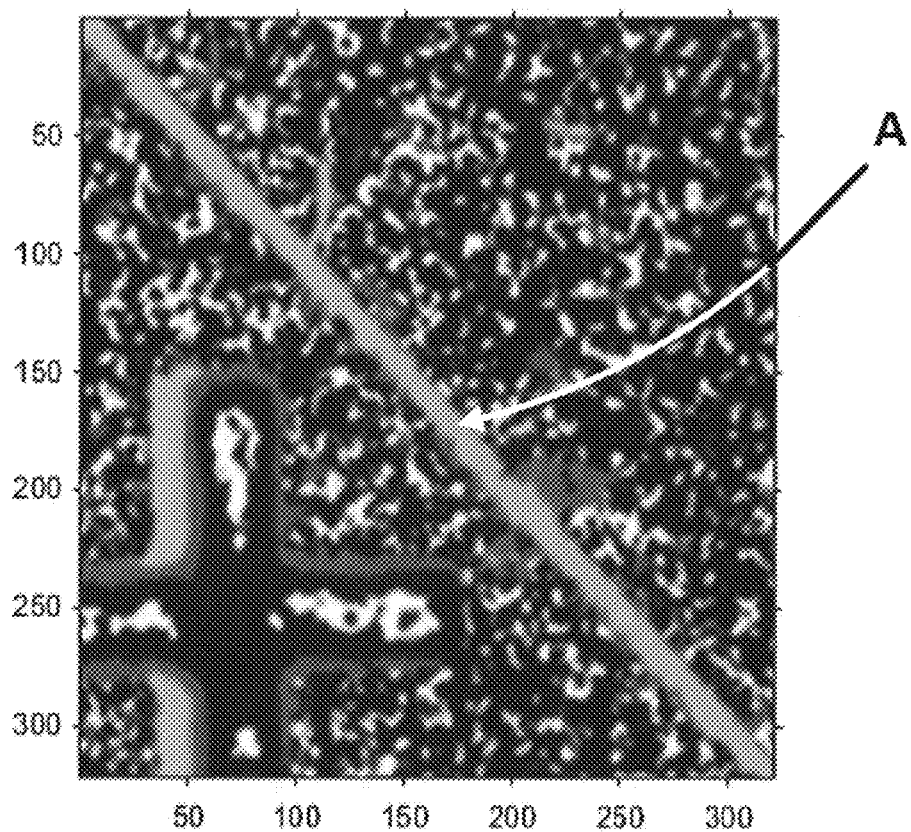
FIG. 4 shows a cropped image of the diagonal line segment (A) of Case 1 as described herein, where the algorithm crops the image to verify that the diagonal line segment was correctly chosen.

Referring now to FIGS. 1A and 1B, in one aspect, a method is disclosed of detecting a misalignment condition between a microscope slide (102) and a platform (104) upon which the microscope slide (102) is disposed. In one embodiment, the method includes identifying, in an image that includes at least a portion of the microscope slide (102) and at least a portion of the platform (104), a platform feature (110); (b) identifying in the image, a first edge of the platform (106) and a first edge of the microscope slide (112), wherein identification of the first edge of the platform (106) in the image is aided by identification of a first reference point (118) of the platform feature (110); (c) calculating a value of a first distance between the first edge of the platform (106) and the first edge of the microscope slide (112) in the image, wherein if the value of the first distance lies outside a first pre-determined range of values, a misalignment condition between the microscope slide (102) and the platform (104) is detected.

In a particular embodiment, the method further includes (a) identifying, in the image, a second edge (108) of the platform (104) and a second edge (114) of the microscope slide (102), wherein identification of the second edge (108) of the platform in the image is aided by identification of a second reference point (120) of the platform feature (110); and, (b) calculating a value of a second distance that is a shortest distance between the second edge (108) of the platform (104) and the second edge (114) of the microscope slide, wherein if the value of the first distance lies outside the first pre-determined range of values or if the value of the second distance lies outside a second pre-determined range of values, a misalignment condition between the microscope slide (102) and the platform (104) is detected.

In another particular embodiment, the method further includes converting the image to a grayscale image (for example, see FIGS. 2-4, and 6-8) to aid in detection of one or more of the platform feature (110), the first edge of the platform (106), the second edge of the platform (108), the first edge of the microscope slide (112), and the second edge of the microscope slide (114).

In yet another particular embodiment, the platform feature (110) is located in an image frame such that it forms a known angle (see FIG. 1B) with an x-axis of an x-y coordinate plane of the image. In still other particular embodiments, the platform feature (110) is of a known length. In even other particular embodiments, the platform feature (110) is imaged through the microscope slide.

Figure 5:
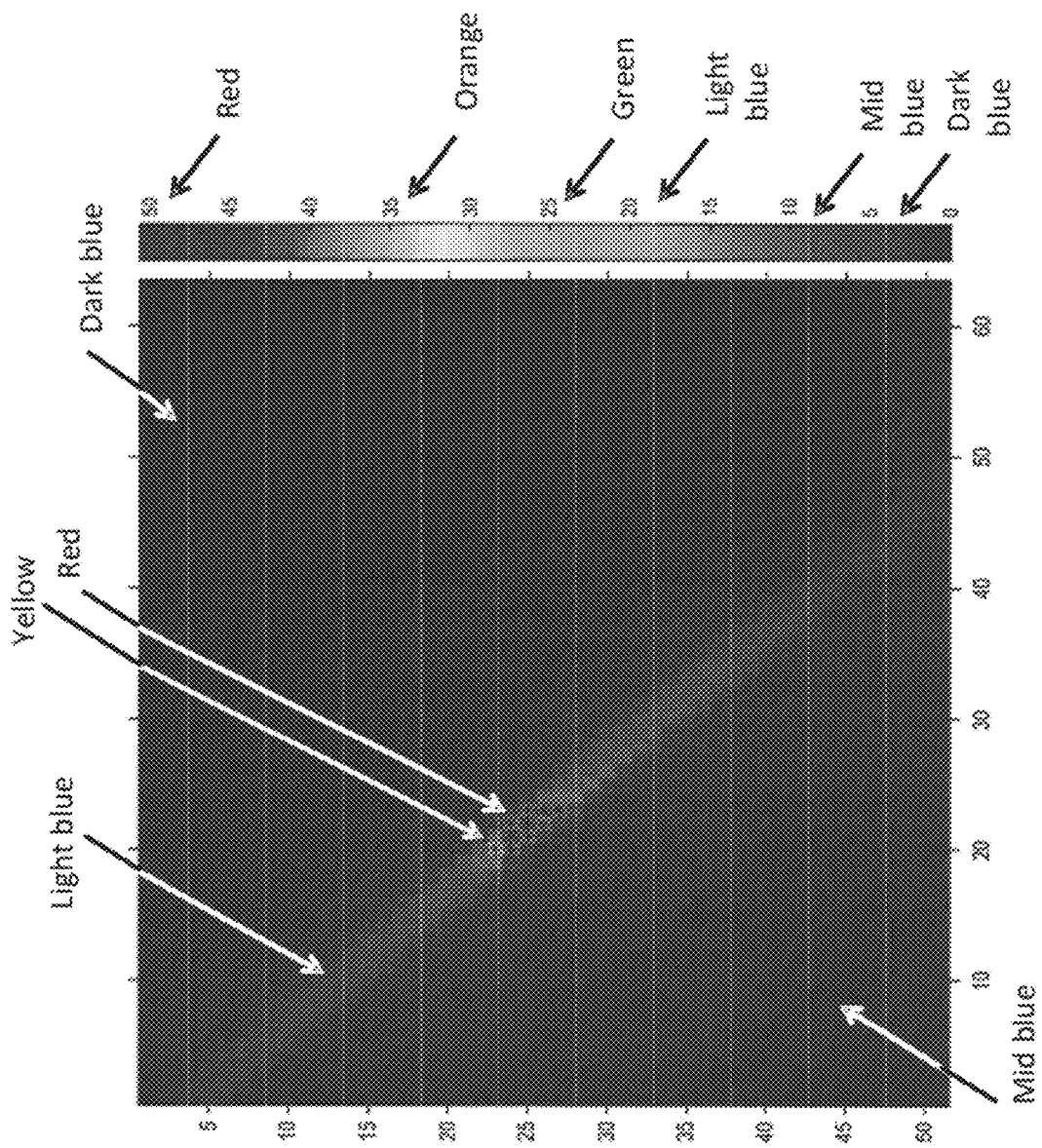
FIG. 5 shows an image of an exemplary cost function matrix where the rows indicate the different starting locations of the best row index for the left-most location of the diagonal line segment, while the columns indicate the different locations of the best column index for the left-most location The plot is represented in "colormap jet" in MATLAB, where blue color denotes lower pixel magnitudes and the red color denotes higher values.
Figure 6:
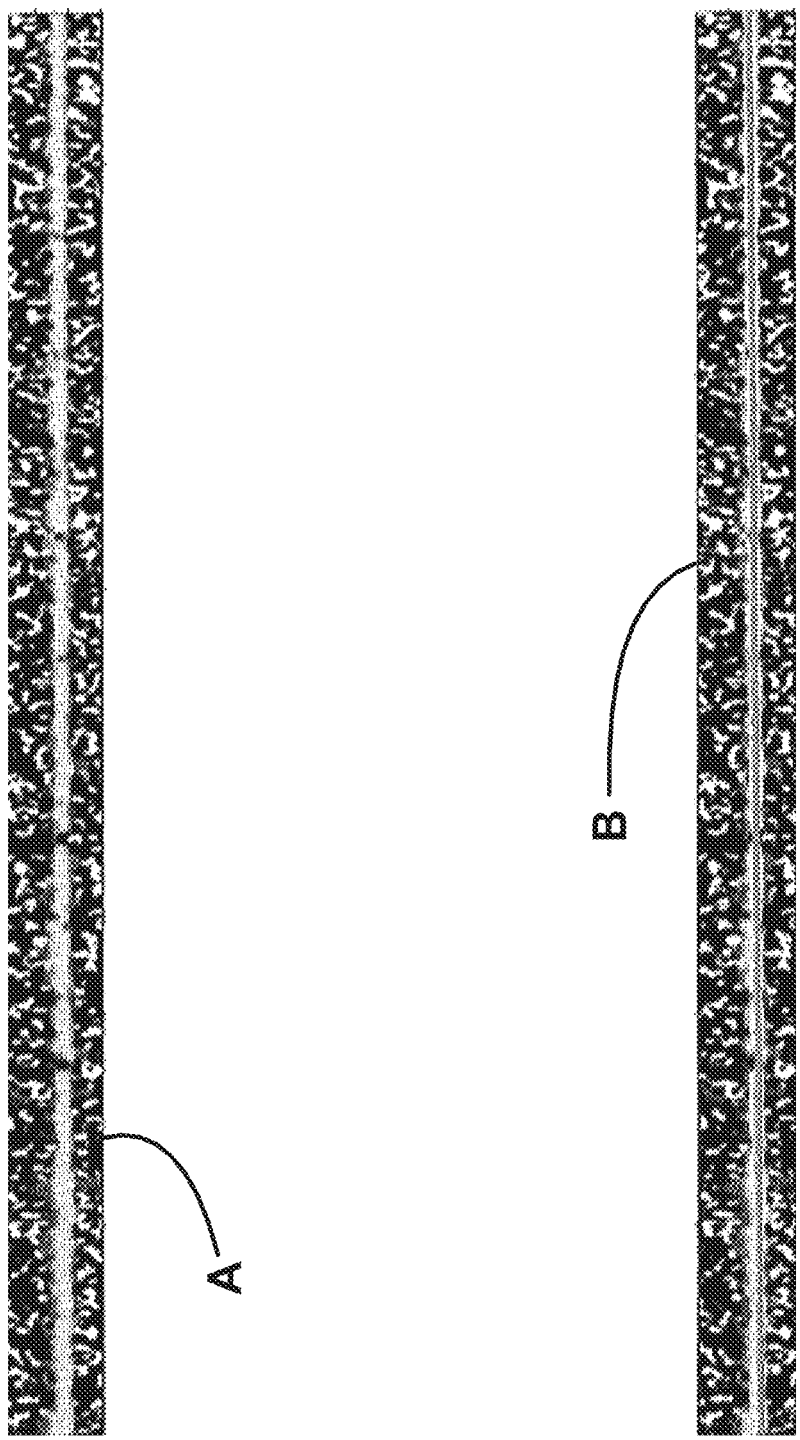
FIG. 6 shows transposed images of vertical line segments according to a disclosed embodiment, wherein in panel (A) is shown the raw image of the transposed line segment and in panel (B) a candidate line is shown superimposed on the transposed line segment image.
Figure 7:
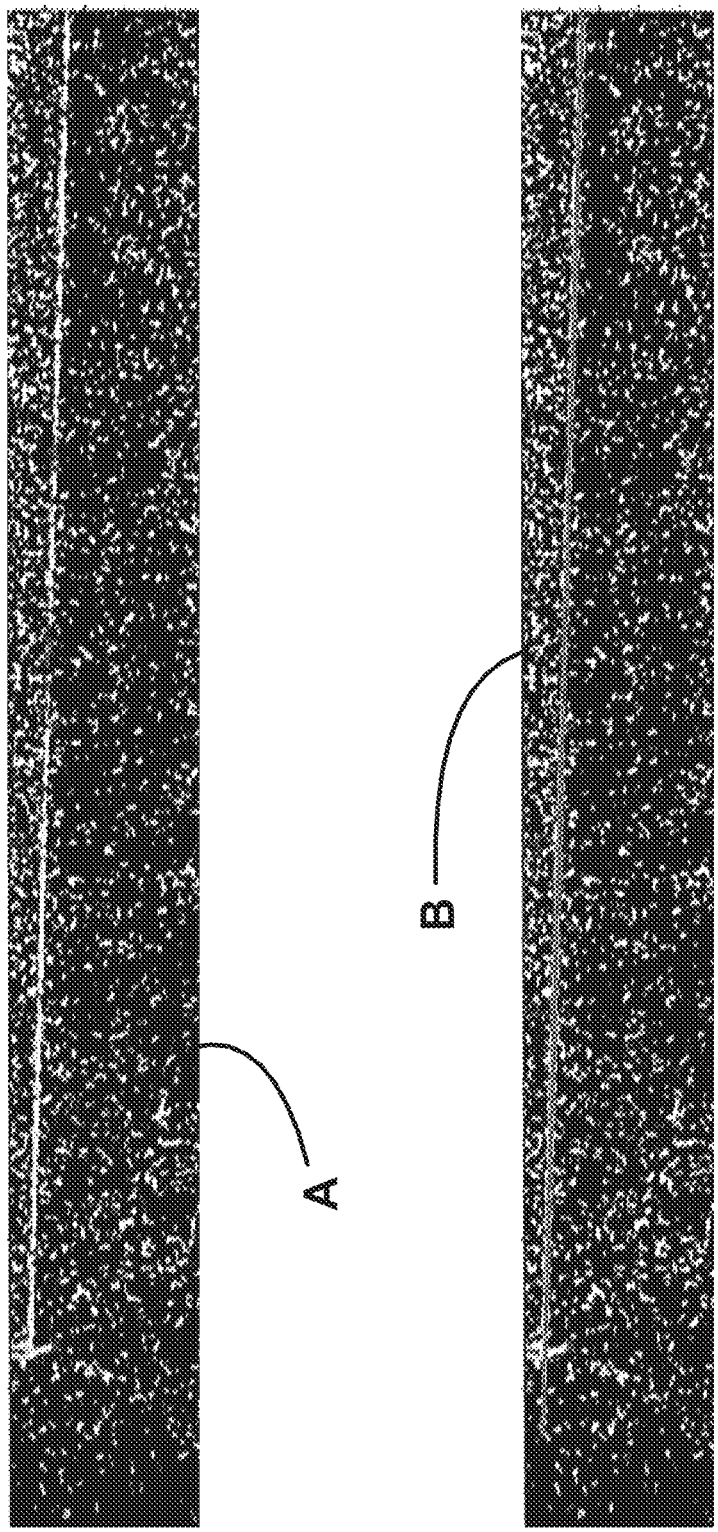
FIG. 7 shows transposed images of the sloping vertical line segments according to a disclosed embodiment, wherein in panel (A) is shown the raw image of the transposed line segment and in panel (B) a candidate line is shown superimposed on the transposed line segment image.
Figure 8:
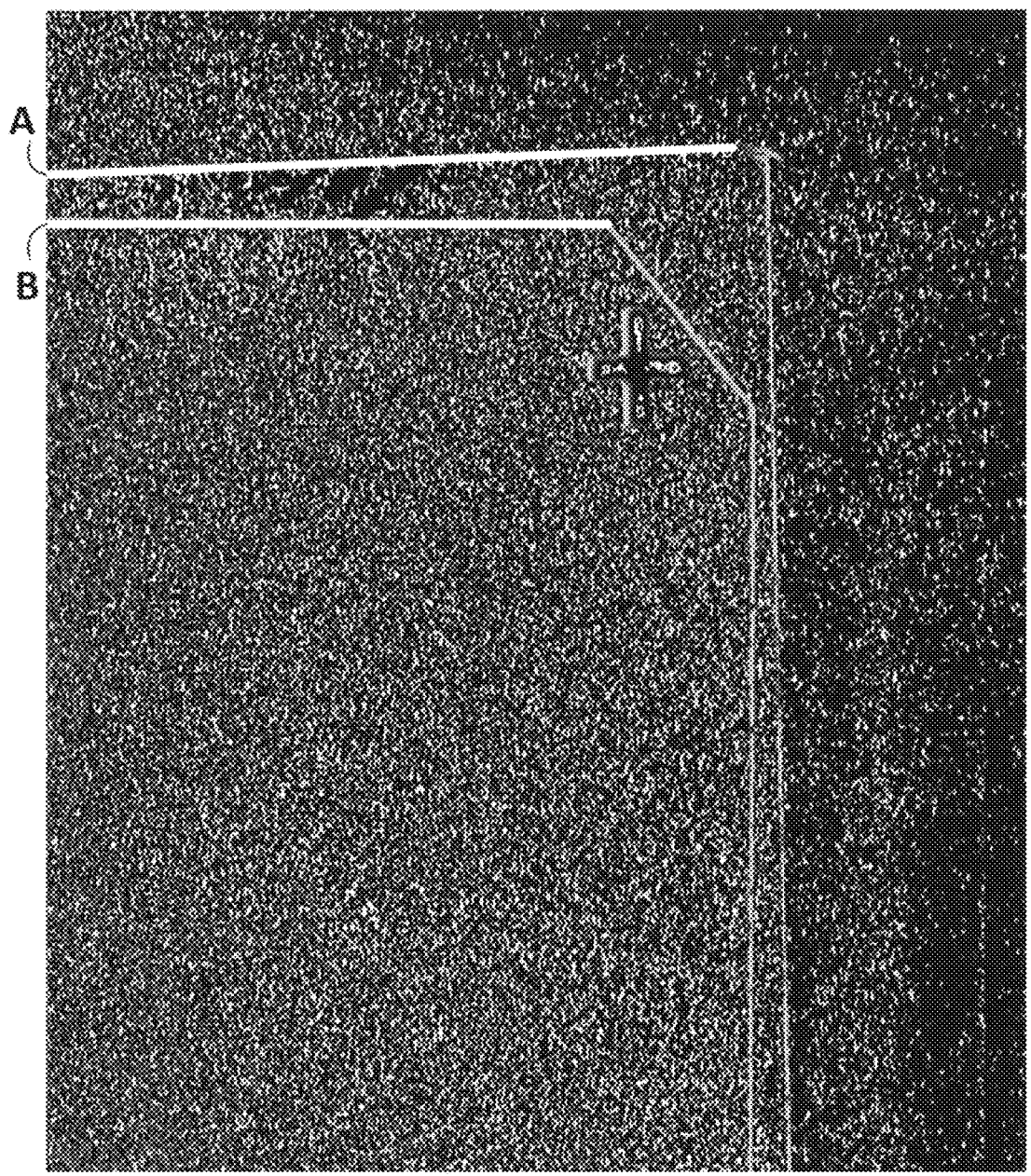
FIG. 8 shows the detection and highlighting of a horizontal line segment of a platform (B) and a horizontal line segment of a microscope slide (B), wherein the shortest distance between the segment could be determined from the left edge of the image where the line segments terminate.

In more particular embodiments, identifying one or more of the platform feature (110), the first edge of the platform (106), the second edge of the platform (108), the first edge of the microscope slide (112), and the second edge of the microscope slide (114) includes selecting from a potential set of line segments a line segment to represent the one or more of the platform feature (110), the first edge of the platform (106), the second edge of the platform (108), the first edge of the microscope slide (112) and the second edge of the microscope slide (114). In even more particular embodiments, selecting includes selecting a potential line segment based on a cost function (see, for example, FIG. 5).

In still other more particular embodiments, at least one of the first edge of the platform (106), the second edge of the platform (108), the first edge of the microscope slide (112), and the second edge of the microscope slide (114) appears as a vertical line in an image and identifying further comprises transposing at least a portion of the image prior to selecting a line segment to represent the one or more of the platform feature (110)(see FIGS. 6 and 7), the first edge of the platform (106), the second edge of the platform (108), the first edge of the microscope slide (112) and the second edge of the microscope slide (114).

In another embodiment, the disclosed method further includes repositioning the microscope slide on the platform in response to detection of a misalignment condition. In further the disclosed method is repeated following a repositioning action to detect if the misalignment condition is resolved.

Figure 9A:
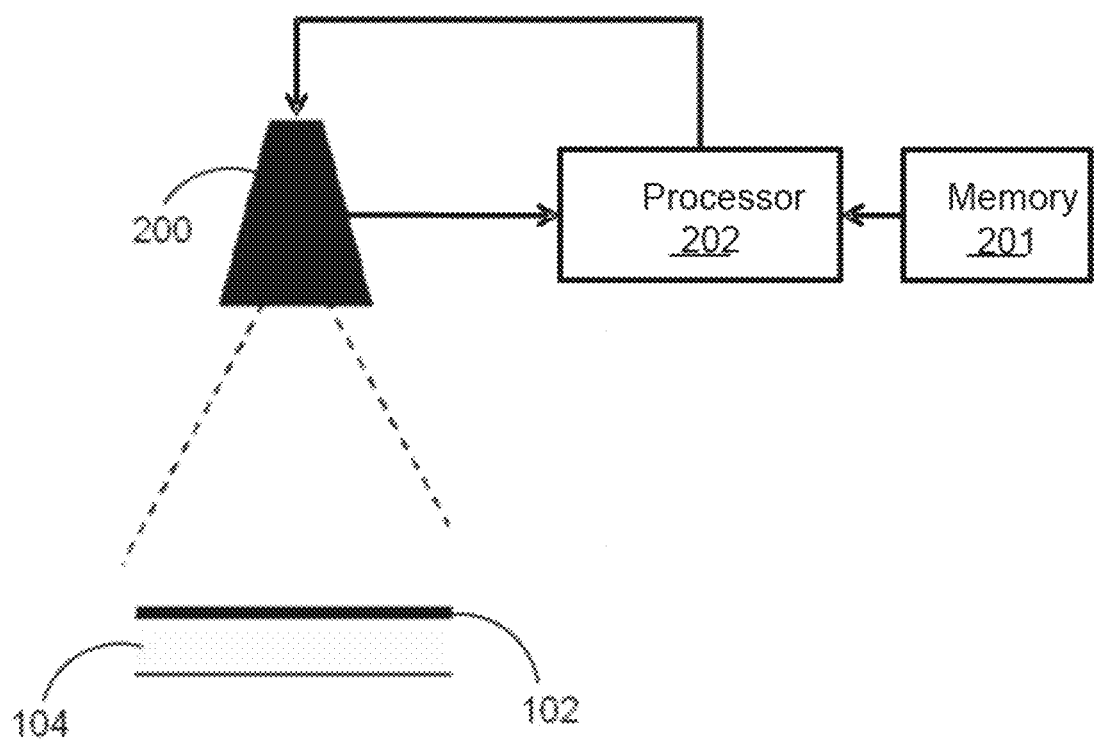
FIG. 9A shows an embodiment of a slide detection system.
Figure 9B:
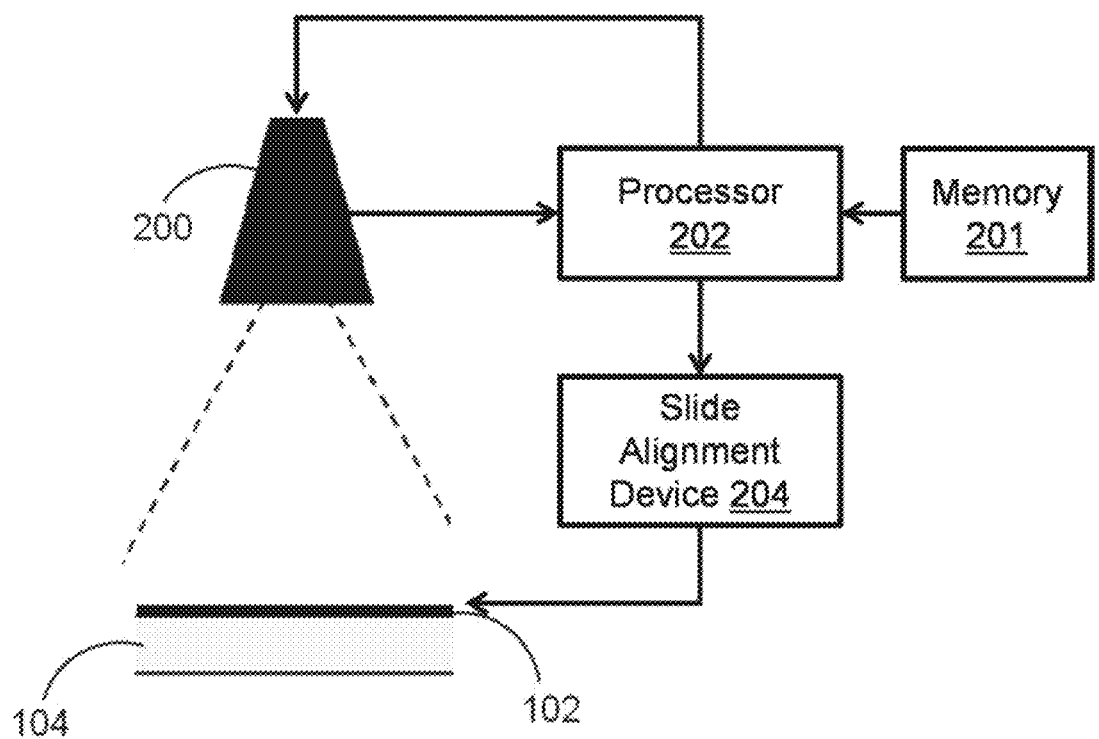
FIG. 9B shows an embodiment of a slide detection and alignment system.

In another aspect, and with respect to FIGS. 9A and 9B, a system is disclosed for determining a slide misalignment condition between a microscope slide (102) and a platform (104). In one embodiment, the system includes (a) a camera (200) disposed above the microscope slide (102) and the platform (104) such that at least a portion of the microscope slide (102) and at least a portion of the platform (104) are positioned in a field of view of the camera; and (b) a processor (202), wherein the processor is configured to operate according to instructions stored in a memory (201) to control the camera to obtain an image and to perform any of the disclosed embodiments of the method to detect the slide misalignment condition.

In one embodiment, the system further includes a slide alignment device (204), wherein the memory (201) further stores instructions that cause the processor (202) to control the slide alignment device to position or reposition the microscope slide (102) on the platform (104) either initially, or in response to a detected misalignment condition, respectively. The processor can be further caused by instruction stored in the memory to repeatedly reposition the microscope slide one or more times, such as up to a pre-determined number of times, before a failure condition is indicated.

In particular embodiments, the platform (104) can be a heating and/or cooling platform of an automated slide staining device. In other particular embodiments the platform (104) includes a platform feature (110) detectable in the field of view of the camera (202), and the platform feature (110) can be of known length and/or appears in a known orientation in the image obtained by the camera.

In other particular embodiments, the microscope slide is transparent and the platform feature (110) can be imaged through the microscope slide.

In another embodiment, the slide alignment device (204) is controlled by the processor (202) according to instructions stored in the memory (201) that cause the slide alignment device to place the slide onto the platform (104) such that a right-angled corner (116) of the microscope slide (102) extends over the platform feature (110).

Examples

In one embodiment, the original RGB image is smoothed using a 3×3 median filter followed by a 5×5 Gaussian kernel to aide in removing small local artifacts and discontinuities in the image, which may have an effect on detecting the misalignment. The algorithm then creates an inverse grayscale of the original RGB image to produce the digital image used by the algorithm (where the inverse grayscale image may be defined as (1−double(grayscale)/255)). This digital image is divided into four quadrants: a top left quadrant, a top right quadrant, a bottom left quadrant, and a bottom right quadrant. Considering the top right quadrant of the digital image, the platform (104) has a horizontal edge (106) and a vertical edge (108) and the microscope slide (102) has a slide horizontal edge (112) and a slide vertical edge (114) that connect to form a right-angled corner (116). In a grayscale version of the original image, the pair of horizontal edges (106,112) and vertical edges (108,114) appear darker relative to their immediate background. As previously mentioned, the digital image is an inverse grayscale image where the pair of horizontal (106,112) and vertical edges (108,114) appear near white. These near white pixels have magnitudes that are significantly higher than surrounding pixels (pixels comprising the immediate background).

The aforementioned pairs of horizontal and vertical lines in the digital image may not be perfectly horizontal or perfectly vertical to one another. In some cases, these vertical and horizontal lines may be very faint, thus if the main focus is detecting these two pairs of lines, robustness issues will arise. The disclosed method instead focuses on detecting a reference line pattern (110) common to all slide placement images. This reference line pattern (110) is located in the top right quadrant of the digital image and joins the vertical edge (108) of the platform (104) to the horizontal edge (106), such that the right-angled corner (116) of the microscope slide (102) extends beyond the reference line pattern (110). Three cases are considered: (i) the case in which the reference line pattern is a diagonal line segment creating a 135° angle with the positive x-axis of the x-y coordinate plane, (ii) the case in which the reference line pattern is a diagonal whose angle with the positive x-axis is only approximately known, and (iii) the case in which the reference line pattern may represent any pattern (e.g. a line segment of any angle with respect to the x-axis, or a curve) as long as the length and the parametric form of the line pattern is known.

To illustrate the method, the image processing algorithm was implemented in MATLAB. However, it should be clear to one of ordinary skill in the art that execution of the algorithm is not limited to MATLAB, and it may be implemented in other programing environments such as C++, and the like.

Case 1: The Reference Line Pattern is a Diagonal Line Segment Creating a 135° Angle with Respect to the Positive x-Axis.

As mentioned previously, the algorithm identifies the location of the diagonal line segment (110) joining the horizontal edge (106) and the vertical edge (108) of the platform (104), where a length of the diagonal line segment (110) is known. Also, an angle, θ, between the diagonal line segment (110) and the positive x-axis (of the x-y coordinate plane) measures 135 degrees. In one embodiment, to identify the location of the diagonal line segment (110), a first set of potential line segments is generated. Potential line segments are line segments that reflect the known features of the diagonal line segment (110), i.e., the angle between each potential line segment and the positive x-axis measures 135 degrees and the length of each potential line segment is the known length of the diagonal line segment (110). The set of potential line segments are located in the top right quadrant of the digital image (100).

To identify the potential line segment that is most likely the location of the diagonal line segment (110), a first cost function is calculated for each. Further, each potential line segment comprises a set of pixels (each pixel in the set of pixels having a magnitude). In an exemplary embodiment, (r,c) may denote the location of a potential line segment, where r is the row index and c is the column index in the top right quadrant of the digital image. It is assumed that the length, L, of the diagonal line segment (110) is known. Thus, with a top left location at (r,c), a search window is created from row=r to row=r+L and from column=c to column=c+L. The diagonal line segment (110), definitively located within this window, will contain all the high valued pixels while a standard deviation will be low (high or low relative to the corresponding values of the remaining pixels in the window). For each potential line segment, considering the inverse grayscale image, the first cost function is represented as:

Cost=(mean of the magnitude of the pixels comprising the diagonal line segment and immediate off-diagonal pixels)/(standard deviation of the pixels comprising the diagonal line segment and immediate off-diagonal pixels+0.001).

Immediate off-diagonal pixels, (that is, pixels that are either one pixel above or one pixel below each pixel comprising a potential line segment), are also considered as in some cases the diagonal line segment (110) may be blurred. Considering more pixels makes the average/standard deviation based computation more robust. Additionally, the 0.001 in the denominator ensures that division by zero will not occur even if all of the pixels included in the computation have the same magnitude. The diagonal line segment (110) is comprised of pixels having magnitudes approximately equal in value and having magnitudes higher than those of surrounding pixels. Therefore, the set of pixels comprising an optimal potential line segment have an average magnitude higher than the magnitudes of surrounding pixels and a near-zero standard deviation. Thus, selecting the potential line segment that yields a highest value of the first cost function identifies the location of the diagonal line segment (110).

Identifying the location of the diagonal line segment (110) provides two reference points in the digital image effective for locating the vertical edge (108) of the platform (104) and the slide vertical edge (114) (and subsequently the horizontal edge (106) of the platform (104) and the slide horizontal edge (112)). These two reference points are a left-most location (118) and a right-most location (120) of the diagonal line segment (110).

In another embodiment, the next step of the algorithm is locating the vertical edge (108) of the platform (104). A transposed version of the top right quadrant of the digital image (100) is obtained and a second set of potential line segments are generated such that each potential line segment has a slope between −0.1 to 0.1. This second set of potential line segments are located within a first window of the transposed version of the top right quadrant of the digital image. Experimentally, the vertical edge (108) of the platform (104) was found to lie typically within 30 pixels to the right of the rightmost location of the diagonal line segment (110). Thus, the first window comprises columns of thirty pixels beginning at the right-most location (120) of the diagonal line segment (110) and extending upwards and rows of pixels beginning from the right-most location (120) of the diagonal line segment (110) and extending (to the right) to an end of the transposed version of the top right quadrant of the digital image (100). Further embodiments feature a second cost function calculated for each potential line segment. Each potential line segment comprises a set of pixels, wherein each pixel of the set of pixels has a magnitude greater than a cutoff magnitude. The second cost function is calculated as:

Cost=(the average of the magnitudes of each pixel in a potential line segment)/(the standard deviation of the pixels comprising the potential line segment+0.0001).

The potential line segment yielding a highest value of the second cost function identifies the location of the vertical edge (108) of the platform (104).

Another embodiment next identifies the location of the slide vertical edge (114). Locating the slide vertical edge (114) may comprise generating a third set of potential line segments having a slope within a range of −0.2 to 0.2 (since the slide vertical edge (114) is typically more slanted than the vertical edge (108) of the platform (104)). This set of potential line segments are also located within the transposed version of the top right quadrant of the digital image (100). More specifically, the third set of potential line segments are located within a second window comprising columns of pixels beginning 10 pixels above the right most location (120) of the diagonal line segment (110) and extending 250 pixels above the right-most location (120) of the diagonal line segment (110) and all rows of pixels in the transposed version of the top right quadrant of the digital image. A third cost function may then be calculated for each potential line segment, where each potential line segment comprises a set of pixels each pixel having a magnitude greater than the cutoff magnitude. The third cost function is calculated as:

Cost=(the average of the magnitudes of each pixel in a potential line segment)/(the standard deviation of the pixels comprising the potential line segment+0.0001).

The potential line segment yielding the highest value of the third cost function identifies the location of the slide vertical edge (114).

A transposed version of the image was obtained when locating the vertical edge (108) of the platform (104) and the slide vertical edge (114) because the vertical edges become horizontal lines in the transposed image and hence, the algorithm looks for lines with slopes in the range [0.1, −0.1]. It is easier to define a window of 0.1 around an expected slope when searching for lines with a slope close to zero. If searching for lines with slopes close to infinity (vertical lines), then the window is difficult to define.

In some embodiments, locating the horizontal edge (106) of the platform (104) in the original (non-transposed, inverse grayscale) digital image is next. A fourth set of potential line segments, each having a slope within a range of [−0.1, 0.1] may be generated. This set of potential line segments are located within a third window. The third window may comprise rows of pixels within 30 pixels above the left-most location (118) of the diagonal line segment (110), and all columns of pixels in the top right quadrant of the original digital image (100). A fourth cost function for each potential line segment may then be calculated, where each potential line segment comprises a set of pixels having a magnitude greater than the cutoff magnitude. Similar to the second and third cost function, the fourth cost function is calculated as follows:

Cost=(the average of the magnitudes of each pixel in a potential line segment)/(the standard deviation of the pixels comprising the potential line segment+0.0001).

The potential line segment yielding the highest value of the fourth cost function identifies the location of the horizontal edge (106) of the platform (104).

Further locating the slide horizontal edge (112) in the original (non-transposed, inverse grayscale) digital image follows. A fifth set of potential line segments, each having a slope within a range of [−0.2, 0.2] may be generated (since the slide horizontal edge (114) is typically more slanted than the horizontal edge (106) of the platform (104)). The fifth set of potential line segments are located within a fourth window. The fourth window may comprise rows within 33 pixels to 250 pixels above the left-most location (118) of the diagonal line segment (110) and all columns in the top right quadrant of the original digital image (100). A fifth cost function for each potential line segment may then be calculated. Each potential line segment comprises a set of pixels, where each pixel of the set of pixels has a magnitude greater than the cutoff magnitude. The fifth cost function is calculated as follows:

Cost=(the average of the magnitudes of each pixel in a potential line segment)/(the standard deviation of the pixels comprising the potential line segment+0.0001).

The potential line segment that yields the highest value of the fifth cost function is selected, thereby identifying the slide horizontal edge (112).

After identifying the locations of the pair of horizontal edges (106,112) and the pair of vertical edges (108,114) of the of the platform (104) and the microscope slide (102), a first and second distance is calculated. The value of the first distance is the shortest horizontal distance between the vertical edge (108) of the platform (104) and the slide vertical edge (114). The value of the second distance is the shortest vertical distance between the horizontal edge (106) of the platform (104) and the slide horizontal edge (112). If the value of the first distance is greater than a first threshold maximum value or smaller than a first threshold minimum value then a misalignment between the microscope slide (102) and the platform (104) is detected. A misalignment is also detected If the value of the second distance is greater than a second threshold maximum value or smaller than a second threshold minimum value.

In one embodiment, the algorithm exports pixel data of each digital image to a pre-populated spreadsheet where calculations for the pass/fail criteria are made as seen in Table 1 below.

TABLE 1

Non-limiting Example of Slide Placement Test Results

| | a | | b | | c | | d | | e |
|---|---|---|---|---|---|---|---|---|---|
| Slide ID | Horizontal over-hang (pixels) | Vertical over-hang (pixels) | Horizontal over-hang (mm) | Vertical over-hang (mm) | Horizontal condition (>=0.6 mm) | Horizontal condition (<=1.9 mm) | Vertical condition (>=0.3 mm) | Vertical condition (<=1.0 mm) | Pass/Fail |
| 1 | 86.00 | 53.50 | 1.52 | 0.94 | 0.92 | 0.38 | 0.64 | 0.06 | Pass |
| 2 | 86.00 | 141.50 | 1.52 | 2.50 | 0.92 | 0.38 | 2.20 | −1.50 | Fail |
| 3 | 79.85 | 55.79 | 1.41 | 0.98 | 0.81 | 0.49 | 0.68 | 0.02 | Pass |
| 4 | 40.16 | 80.47 | 0.71 | 1.42 | 0.11 | 1.19 | 1.12 | −0.42 | Fail |
| 5 | 90.34 | 57.00 | 1.59 | 1.01 | 0.99 | 0.31 | 0.71 | −0.01 | Fail |
| 6 | 41.50 | 29.50 | 0.73 | 0.52 | 0.13 | 1.17 | 0.22 | 0.48 | Pass |
| 7 | 102.00 | 19.32 | 1.80 | 0.34 | 1.20 | 0.10 | 0.04 | 0.66 | Pass |
| 8 | 33.80 | 49.32 | 0.60 | 0.87 | 0.00 | 1.30 | 0.57 | 0.13 | Pass |
| 9 | 107.91 | 21.15 | 1.90 | 0.37 | 1.30 | 0.00 | 0.07 | 0.63 | Pass |
| 10 | 102.00 | 56.50 | 1.80 | 1.00 | 1.20 | 0.10 | 0.70 | 0.00 | Pass |

Calculation:

Heater width=22.5 mm(1275 pixels)

Horizontal over-hang threshold: >=0.60 mm AND<=1.90 mm

Vertical over-hang threshold: >=0.30 mm AND<=1.00 mm

The following is a description of what is calculated in each of the columns of the spreadsheet of Table 1:

(b) Slide Over-hang Values in Pixels: These are slide over-hang values (expressed in pixels) imported directly from the algorithm program (e.g. the MATLAB test script in the present case).

(c) Pixel-to-Millimeter Conversion: Calculation to convert the pixel measurements in (b) to millimeters.

(d) Slide Over-Hang Condition Calculation: Calculates the amount of slide over-hang based on the requirements.

(e) Pass/Fail Criteria: Calculates and outputs the Pass/Fail indication based on the condition calculations.

In some embodiments, when locating the diagonal line segment (110), the potential line segments representing potential locations of the diagonal line segment (110) are located within a fifth window. In the fifth window, a left-most location (118) of the diagonal line segment (110) is located within rows 25% to 50% from a top row of the digital image and within columns 55% to 83% from a left-most column of the top right quadrant of the digital image (100).

Further, one or more predetermined values of the cutoff magnitude is used to narrow the set of potential line segments. For robustness purposes, the algorithm may test different cutoffs when significant pixels (those contributing to a potential line segment) are considered. Cutoff values tested were in the range [0.8, 0.6, 0.5, 0.4, 0.2]. For each cutoff, pixels comprising a potential line segment must be larger than the given cutoff, for those satisfying this constraint, the cost function is calculated (this holds for each of the five cost functions). In other embodiments, the algorithm considers potential line segments that yield the 10 highest cost functions (for each of the five cost functions) and sorts them in decreasing order. If the mean of the pixels comprising a potential line segment is less than 0.8 times the cutoff, then the algorithm discards it. The cost function yielding the highest value is then selected.

For example, when locating the vertical edge (108) of the platform (104), using a cutoff of 0.6, the cost, slope with respect to the x-axis, and y-intercept of the top 10 potential line segments were found (as seen in Table 2).

TABLE 2

| COST | SLOPE | Y-INTERCEPT |
|---|---|---|
| 24.4503 | −0.0045 | 38.6222 |
| 24.1824 | −0.0012 | 36.2973 |
| 24.1295 | 0.0000 | 35.0000 |
| 23.9320 | −0.0050 | 38.4523 |
| 23.7867 | −0.0011 | 35.2555 |
| 23.2985 | −0.0056 | 39.3322 |
| 22.6123 | 0.0029 | 32.5234 |
| 22.2790 | −0.0051 | 40.0169 |
| 21.4830 | 0.0023 | 31.9241 |
| 20.9726 | 0.0027 | 31.6578 |

The potential line segment with a slope of −0.0045 and a y-intercept of 38.622 was selected as the diagonal line segment (110). Similarly, the cost, slope and y-intercept of the top two potential line segments for the slide vertical edge (114) were found using a cutoff of 0.8, to be:

| COST | SLOPE | Y-INTERCEPT |
|---|---|---|
| 8.0503 | 0.0296 | 18.3964 |
| 7.9779 | 0.0299 | 18.0351 |

The potential line segment yielding the highest cost function is selected as the slide vertical edge (114). Once the two vertical edges are identified, the shortest horizontal distance between these two lines is calculated considering the image portion below the bottom-most location of the diagonal line segment (110). The distance between the two most prominent vertical lines is 40.16(34) as seen in Table 1.

The cost, slope with respect to the x-axis, and y-intercept of the top 10 potential line segments were found (as seen in Table 3) in the detection of the horizontal edge (106) of the platform (104) as well. Based on these results, a potential line segment with slope=0.0030 and y-intercept=28.6870 was chosen. After experimenting with the aforementioned cutoff values, a cutoff of 0.6 acquired the highest cost functions and the potential line segment selected had a cost of 4.7281, a slope of −0.0313 and a y-intercept of 168.2500. Referring to Table 1, for these horizontal lines, the minimum vertical distance was found to be 80.47(12).

TABLE 3

| COST | SLOPE | Y-INTERCEPT |
|---|---|---|
| 17.3246 | 0.0030 | 28.6870 |
| 17.2981 | 0.0033 | 27.5299 |
| 17.1581 | 0.0019 | 28.3270 |
| 17.1325 | 0.0016 | 29.9822 |
| 17.0916 | 0.0025 | 29.4887 |
| 17.0587 | 0.0036 | 28.7925 |
| 17.0020 | 0.0037 | 29.2829 |
| 16.9065 | 0.0000 | 31.0000 |
| 16.8707 | 0.0056 | 28.5778 |
| 16.7518 | 0.0086 | 24.6658 |

Case 2: The Reference Line Pattern is a Diagonal Line Segment Creating an Angle with Respect to the Positive x-Axis that is Approximately Known.

In an embodiment, detecting a misalignment between the microscope slide (102) and the platform upon which the microscope slide (102) is disposed comprises first locating the diagonal line segment (110) that joins the horizontal edge (106) and the vertical edge (108) of the platform (104). Here, the diagonal line segment (110) has a length L and a reference angle θ, where θ is the angle between the diagonal line segment (110) and the positive x-axis. The algorithm first generates a plurality of potential line segments each having a length equal to L and a reference angle equal to θ. Each potential line segment is defined by a center pixel. Next, the center pixel of each potential line segment may be superimposed on each pixel of a plurality of pixels comprising the top right quadrant of the inverse grayscale digital image. A first cost function is calculated for each potential line segment for each pixel in the top right quadrant of the digital image (100). Each potential line segment is comprised of a set of pixels, where each pixel in the set of pixels has a magnitude. In some embodiments, the first cost function may defined as follows:

cost=(mean of the magnitude of the pixels comprising the diagonal line segment and immediate off-diagonal pixels)/(standard deviation of the diagonal and immediate off-diagonal pixels+0.001).

The immediate off-diagonal pixels are pixels either one pixel above or one pixel below each potential line segment and are also considered as in some cases the diagonal line segment (110) may be blurred. Considering more pixels makes the average/standard deviation based computation more robust. Additionally, the 0.001 in the denominator ensures that division by zero will not occur even if all of the pixels included in the computation have the same magnitude. The diagonal line segment (110) is comprised of pixels having magnitudes approximately equal in value and having magnitudes higher than those of surrounding pixels. Therefore the set of pixels comprising an optimal potential line segment have an average magnitude higher than the magnitudes of surrounding pixels and a near-zero standard deviation. Thus, selecting the potential line segment that yields a highest value of the first cost function identifies the location of the diagonal line segment (110).

Identifying the location of the diagonal line segment (110) provides two reference points in the digital image effective for locating the vertical edge (108) of the platform (104) and the slide vertical edge (114) (and subsequently the horizontal edge (106) of the platform (104) and the slide horizontal edge (112)). These two reference points are a left-most location (118) and a right-most location (120) of the diagonal line segment (110).

In another embodiment, the next step of the algorithm is locating the vertical edge (108) of the platform (104). A transposed version of the top right quadrant of the digital image (100) is obtained and a first set of potential line segments are generated such that each potential line segment has a slope between −0.1 to 0.1. This set of potential line segments are located within a first window of the transposed version of the top right quadrant of the digital image. The first window may comprise columns of pixels beginning at the right-most location (120) of the diagonal line segment (110) and extending upwards to a top of the transposed version of the top right quadrant and all rows of pixels in the transposed version of the top right quadrant. In further embodiments, a second cost function is then calculated for each potential line segment. Each potential line segment comprises a set of pixels, wherein each pixel of the set of pixels has a magnitude greater than a cutoff magnitude. As in Case 1, the second cost function is calculated as:

Cost=(the average of the magnitudes of each pixel in a potential line segment)/(the standard deviation of the pixels comprising the potential line segment+0.0001).

The potential line segment yielding a highest value of the second cost function identifies the location of the vertical edge (108) of the platform (104).

Another embodiment next identifies the location of the slide vertical edge (114). Locating the slide vertical edge (114) may comprise generating a second set of potential line segments within the transposed version of the top right quadrant of the digital image (100), each potential line segment having a slope within a range of −0.2 to 0.2 (since the slide vertical edge (114) is typically more slanted than the vertical edge (108) of the platform (104)). The set of potential line segments are located within a second window within the transposed version of the top right quadrant of the digital image. This second window may comprise columns of pixels of the transposed digital image beginning ten pixels above the right-most location (120) of the diagonal line segment (110) extending upwards to the top of the transposed version of the top right quadrant and all rows of pixels in the transposed version of the top right quadrant. Calculating a third cost function for each potential line segment may follow. Each potential line segment may comprise a set of pixels, where each pixel of the set of pixels has a magnitude greater than a cutoff magnitude. The third cost function is calculated as follows:

Cost=(the average of the magnitudes of each pixel in a potential line segment)/(the standard deviation of the pixels comprising the potential line segment+0.0001).

The potential line segment yielding the highest value of the third cost function identifies the location of the slide vertical edge (114).

As in Case 1, the transposed version of the digital image was obtained when locating the vertical edge (108) of the platform (104) and the slide vertical edge (114) so that the vertical edges become horizontal lines in the transposed image and hence, the algorithm looks for lines with slopes in the range [0.1, −0.1]. It is easier to define a window of 0.1 around an expected slope when searching for lines with a slope close to zero. If searching for lines with slopes close to infinity (vertical lines), then the window is difficult to define.

In some embodiments, locating the horizontal edge (106) of the platform (104) in the original (non-transposed, inverse grayscale) digital image comprises generating a third set of potential line segments, each potential line segment having a slope within a range of −0.1 to 0.1. This set of potential line segments are located within a third window, the third window comprising columns of pixels beginning at the left-most location (118) of the diagonal line segment (110) and extending upwards to the first row of the original digital image, and all rows of pixels in the top right quadrant of the original digital image (100).

A fourth cost function for each potential line segment may then be calculated, where each potential line segment comprises a set of pixels having a magnitude greater than the cutoff magnitude. The fourth cost function is calculated as follows:

> Cost=(the average of the magnitudes of each pixel in a potential line segment)/(the standard deviation of the pixels comprising the potential line segment+0.0001).

The potential line segment yielding the highest value of the fourth cost function identifies the location of the horizontal edge (106) of the platform (104).

Further, locating the slide horizontal edge (112) in the original (non-transposed, inverse grayscale) digital image follows. A fourth set of potential line segments, each having a slope within a range of −0.2 to 0.2 may be generated. The fourth set of potential line segments are located within a fourth window. The fourth window may comprise columns of pixels beginning ten pixels above the left-most location (118) of the diagonal line segment (110) and extending upwards to the first row of the original digital image, and all rows of pixels in the top right quadrant of the original digital image (100).

A fifth cost function for each potential line segment may then be calculated. Each potential line segment comprises a set of pixels, where each pixel of the set of pixels has a magnitude greater than a cutoff magnitude. The fifth cost is calculated as:

> Cost=(the average of the magnitudes of each pixel in a potential line segment)/(the standard deviation of the pixels comprising the potential line segment+0.0001).

The potential line segment that yields the highest value of the fifth cost function is selected, thereby identifying the slide horizontal edge (112).

After identifying the locations of the pair of horizontal edges (106,112) and the pair of vertical edges (108,114) of the of the platform (104) and the microscope slide (102), a first and second distance is calculated. The value of the first distance is the shortest horizontal distance between the vertical edge (108) of the platform (104) and the slide vertical edge (114). The value of the second distance is the shortest vertical distance between the horizontal edge (106) of the platform (104) and the slide horizontal edge (112). If the value of the first distance is greater than a first threshold maximum value or smaller than a first threshold minimum value then a misalignment between the microscope slide (102) and the platform (104) is detected. A misalignment is also detected if the value of the second distance is greater than a second threshold maximum value or smaller than a second threshold minimum value.

In further embodiments, the length, L, of the diagonal line segment is within a predetermined range, for example between 200 and 400 pixels. Additionally, the value of θ may be within a predetermined range, for example between −90° and 90°.

In other embodiments, the cutoff magnitude may comprise one or more predetermined values. For example, a cutoff magnitude range may be [0.8, 0.6, 0.5, 0.4, 0.2]. For each cutoff, pixels comprising a potential line segment must be larger than the given cutoff. The cost function (of each or any of the five cost functions) is calculated only for those potential line segments satisfying this constraint.

Case 3: The Reference Line Pattern is Generalized Such that it May Either be a Diagonal Line or a Curve.

In another embodiment, detecting a misalignment between the microscope slide (102) and the platform upon which the microscope slide (102) is disposed comprises first locating the reference line pattern (110) that joins the horizontal edge (106) and the vertical edge (108) of the platform (104). Here, the reference line pattern (110) has a predetermined length and a parametric form. The parametric form is an equation having one or more unknown coefficients that define a shape of the reference line pattern. In further embodiments, identifying the location of the reference line pattern (110) comprises generating a set of potential reference line patterns by varying the one or more unknown coefficients within a determined range. Each potential reference line pattern has the length and the parametric form of the reference line pattern (110) and is defined by a center pixel.

Further, the center pixel of each potential reference line pattern may be superimposed on each pixel of a plurality of pixels comprising the top right quadrant of the (inverse grayscale) digital image. A first cost function is calculated for each potential reference line pattern, where each potential reference line pattern is comprised of a set of pixels. Each pixel in this set of pixels has a magnitude. In some embodiments, the first cost function may defined as follows:

> cost=(mean of the magnitude of the pixels comprising the potential reference line pattern and immediate off-diagonal pixels)/(standard deviation of the reference line pattern and immediate off-diagonal pixels+0.001).

The immediate off-diagonal pixels are pixels either one pixel above or one pixel below each pixel in a potential reference line pattern. These off-diagonal pixels are considered as in some cases the potential reference line pattern (110) may be blurred. Considering more pixels makes the average/standard deviation based computation more robust. Additionally, the 0.001 in the denominator ensures that division by zero will not occur even if all of the pixels included in the computation have the same magnitude. Further, the reference line pattern (110) is comprised of pixels having magnitudes approximately equal in value and having magnitudes higher than those of surrounding pixels. Therefore, the set of pixels comprising an optimal reference line pattern have an average magnitude higher than the magnitudes of surrounding pixels and a near-zero standard deviation. Thus, selecting the potential line segment that yields a highest value of the first cost function identifies the location of the reference line pattern (110).

Identifying the location of the reference line pattern (110) provides two reference points in the digital image effective for locating the vertical edge (108) of the platform (104) and the slide vertical edge (114) (and subsequently the horizontal edge (106) of the platform (104) and the slide horizontal edge (112)). These two reference points are a left-most location (118) and a right-most location (120) of the reference line pattern (110).

In another embodiment, the next step of the algorithm is locating the vertical edge (108) of the platform (104). A transposed version of the top right quadrant of the digital image (100) is obtained and a first set of potential line segments are generated such that each potential line segment has a slope between −0.1 to 0.1. This set of potential line segments are located within a first window of the transposed version of the top right quadrant of the digital image. The first window may comprise columns of pixels beginning at the right-most location (120) of the reference line pattern (110) and extending upwards to the top of the transposed version of the top right quadrant and all rows of pixels in the transposed version of the top right quadrant. In further embodiments, a second cost function is then calculated for each potential line segment. Each potential line segment comprises a set of pixels, wherein each pixel of the set of pixels has a magnitude greater than a cutoff magnitude. The second cost function is defined as:

Cost=(the average of the magnitudes of each pixel in a potential line segment)/(the standard deviation of the pixels comprising the potential line segment+0.0001).

Again, the 0.0001 in the denominator ensures that division by zero will not occur even if all of the pixels included in the computation have the same magnitude. The potential line segment yielding a highest value of the second cost function identifies the location of the vertical edge (108) of the platform (104).

Another embodiment identifies the location of the slide vertical edge (114) next. Locating the slide vertical edge (114) may comprise generating a second set of potential line segments within the transposed version of the top right quadrant of the digital image (100), each potential line segment having a slope within a range of −0.2 to 0.2 (since the slide vertical edge (114) is typically more slanted than the vertical edge (108) of the platform (104)). The set of potential line segments are located in a second window within the transposed version of the top right quadrant of the digital image. This second window may comprise columns of pixels of the transposed digital image beginning ten pixels above the right-most location (120) of the reference line pattern (110) extending upwards to the top of the transposed version of the top right quadrant and all rows of pixels in the transposed version of the top right quadrant. Calculating a third cost function for each potential line segment may follow. Each potential line segment may comprise a set of pixels, where each pixel of the set of pixels has a magnitude greater than a cutoff magnitude. The third cost function is similarly defined as:

Cost=(the average of the magnitudes of each pixel in a potential line segment)/(the standard deviation of the pixels comprising the potential line segment+0.0001).

The potential line segment yielding the highest value of the third cost function identifies the location of the slide vertical edge (114).

As in Case 1, the transposed version of the digital image was obtained when locating the vertical edge (108) of the platform (104) and the slide vertical edge (114) such that the vertical edges become horizontal lines in the transposed image and hence, the algorithm looks for lines with slopes in the range [0.1, −0.1]. It is easier to define a window of 0.1 around an expected slope when searching for lines with a slope close to zero. If searching for lines with slopes close to infinity (vertical lines), then the window is difficult to define.

In some embodiments, locating the horizontal edge (106) of the platform (104) in the original (non-transposed, inverse grayscale) digital image comprises generating a third set of potential line segments, each potential line segment having a slope within a range of −0.1 to 0.1. The set of potential line segments are located within a third window, the third window comprising columns of pixels beginning at the left-most location (118) of the reference line pattern (110) and extending upwards to the first row of the original digital image, and all rows of pixels in the top right quadrant of the original digital image (100).

A fourth cost function for each potential line segment may then be calculated, where each potential line segment comprises a set of pixels having a magnitude greater than a cutoff magnitude. The fourth cost function may be defined as:

Cost=(the average of the magnitudes of each pixel in a potential line segment)/(the standard deviation of the pixels comprising the potential line segment+0.0001).

The potential line segment yielding the highest value of the fourth cost function identifies the location of the horizontal edge (106) of the platform (104).

Further, locating the slide horizontal edge (112) in the original (non-transposed, inverse grayscale) digital image follows. A fourth set of potential line segments, each having a slope within a range of −0.2 to 0.2 may be generated. The fourth set of potential line segments are located within a fourth window. The fourth window may comprise columns of pixels beginning ten pixels above the left-most location (118) of the reference line pattern (110) and extending upwards to the first row of the original digital image and all rows of pixels in the top right quadrant of the original digital image (100).

A fifth cost function for each potential line segment may then be calculated. Each potential line segment comprises a set of pixels, where each pixel of the set of pixels has a magnitude greater than a cutoff magnitude. The fifth cost function is defined as:

Cost=(the average of the magnitudes of each pixel in a potential line segment)/(the standard deviation of the pixels comprising the potential line segment+0.0001).

The potential line segment that yields the highest value of the fifth cost function is selected, thereby identifying the slide horizontal edge (112).

After identifying the locations of the pair of horizontal edges (106,112) and the pair of vertical edges (108,114) of the of the platform (104) and the microscope slide (102), a first and second distance is calculated. The value of the first distance is the shortest horizontal distance between the vertical edge (108) of the platform (104) and the slide vertical edge (114). The value of the second distance is the shortest vertical distance between the horizontal edge (106) of the platform (104) and the slide horizontal edge (112). If the value of the first distance is greater than a first threshold maximum value or smaller than a first threshold minimum value then a misalignment between the microscope slide (102) and the platform (104) is detected. A misalignment is also detected if the value of the second distance is greater than a second threshold maximum value or smaller than a second threshold minimum value.

In further embodiments, the cutoff magnitude may comprise one or more predetermined values. For example, a cutoff magnitude range may be [0.8, 0.6, 0.5, 0.4, 0.2]. For each cutoff, the magnitudes of pixels comprising a potential reference line pattern must be larger than the given cutoff. The cost function (for each or any of the five cost functions) is calculated only for those potential line segments satisfying this constraint.

In some embodiments, the reference line pattern (110) is a straight line segment. Other embodiments feature a curve as the reference line pattern (110). For a linear reference line pattern, the parametric form may be of the form y=ax+b, where the coefficients a and b are varied (for example, between −20 and 20). Knowing the range of the coefficients enables all lines for given parameter ranges to be generated (having the same length, L). The first cost function is then computed for all generated lines while varying the center, c, of each line. The potential reference line pattern yielding a maximum first cost function is the potential reference line pattern with optimal parameters a, b, and c.

Parametric forms of curved reference line patterns may be of the form $y=ax^2+bx+c$ and the unknown coefficients (a, b, and c) may vary within a predetermined range (e.g. −20 and 20). Similar to the linear case, knowing the range of the coefficients enables all parametric curves for given parameter ranges to be generated (having the same length, L). And the optimal reference line pattern yielding the highest first cost function is selected, where a, b, c, and d are optimized (d is the center pixel of the reference line pattern).

Variation of Case 1

If runtime is a constraint, then the process of finding the location of the diagonal line segment (110) may be adjusted. If the length, L, of the diagonal line segment is known, then the mean and standard deviation for every L×L window is found, while considering the diagonal elements in this window. To accomplish this, a filter of size L×L may be created where the elements comprising a potential diagonal line and immediate off-diagonal elements are 1 and every other pixel in the window is assigned a value of 0. (As previously mentioned, the immediate off-diagonal elements are either one pixel above or one pixel below a potential diagonal line.) To ensure that the sum of all pixels in this filter (or window) is 1, each pixel is divided by the total number of ON pixels (pixels with values >0) in the filter window.

Letting X denote the entire top right quadrant of the inverse digital image. If the top right quadrant is convolved with the L×L filter, then at every pixel in the filtered digital image, the mean of the (potential diagonal line+immediate off diagonal) pixels is obtained. Let F denote the L×L filter. Then EX (first moment)=imfilter($X^2$, F), where imfilter denotes the filtering operation of filtering image X with filter F. EX2 (second moment)=imfilter($X^2$,F), where $X^2$ denotes an image where every pixel of the image is the square of the corresponding pixel in image X. Now, variance is defined as (second moment−(square of EX)). Therefore, the variance of (the diagonal and off diagonal) pixels in each L×L window of the image X is computed as: VARX=(EX2−EX*EX). The feature which computes (mean of the diagonal and off-diagonal pixels in each L×L window)/(0.001+standard deviation of the diagonal and off-diagonal pixels in each L×L window), can be expressed as: EX./(0.001+sqrt (VARX)). Here, ./ denotes element-wise division between the two matrices, EX and (0.001+sqrt(VARX), where sqrt denotes the element-wise square root operation). The off-diagonal pixels are also considered since more pixels make the average/standard deviation based computation more robust.

The fast computation of the left-most location of the diagonal line segment are found via EX and EX2. For a given window, a threshold shows which significant points to consider. The slope range of allowed line models is known. In the top right quadrant the pixel values are in the range [0,1] and the potential line pixels are higher valued. The best cutoff magnitude value is unknown, so different cutoff magnitudes are used, e.g. [0.8, 0.6, 0.5, 0.4, 0.2]. For a given window, with a selected cutoff magnitude, the significant pixels are found (i.e. pixels whose magnitudes exceed the cutoff). Supposing there are N such points. Now, pairs of two points may be randomly chosen and the line connecting them may be identified. If the fitted line model has a slope within the permissible range of slope values, then this line may be further considered. Otherwise the algorithm moves to the next pair of randomly chosen points.

It now must be determined how many N significant points lie in the best fitting line connecting the two points. Suppose M pixels are within <2 pixels of the fitted line. The mean magnitude of these M pixels are then computed and if the mean magnitude >=(0.8*cutoff), then the fitted line may be a potential good fit. The cost function associated with a potential good fit is: (mean of the M pixel magnitudes which are <2 pixels of the fitted line)/(0.0001+standard deviation of the magnitudes of these M pixels). Now, supposing for a given cutoff, there are K fitted line models which fulfill the (mean magnitudes of the pixels that are within <2 pixels of the fitted line, >=0.8*cutoff) constraint. Then that line model, out of the K models, which yields the maximum value for ((mean of the M pixel magnitudes which are <2 pixels of the fitted line)/(0.0001+standard deviation of the magnitudes of these M pixels)) is regarded as the best fitted line model. It is possible that no solutions are obtained for a given cutoff, if this case arises then the next lower cutoff value is tested and the process is repeated.

Referring to FIG. 14A, in some embodiments, an image analysis system may be utilized for detecting, in a digital image, a misalignment between a microscope slide (102) and a platform (104) upon which the microscope slide (102) is disposed. In some embodiments, the image analysis system may comprise a slide processing station comprising the platform (104), a camera (200) disposed above the microscope slide (102) and the platform (104) such that the microscope slide (102) and the platform (104) are positioned in a field of view of the camera, a processor (202) operatively coupled to the camera (200), and memory (201). The memory (201) may be operatively coupled to the processor (202) and configured to store digitally-encoded instructions that, when executed by the processor (202), cause the processor (202) to perform operations comprising the steps detailed in any of Case 1, 2, or 3.

Referring to FIG. 14B, in other embodiments, an image analysis system may be utilized for detecting, in a digital image, a misalignment between a microscope slide (102) and a platform (104) upon which the microscope slide (102) is disposed, and re-positioning the slide on the platform. In some embodiments, the image analysis system may comprise the platform (104) configured to receive the microscopic slide (102) and a slide alignment device (204) configured to engage the microscopic slide (102) at one or more contact points for moving the microscopic slide (102) on the platform (104). Further embodiments may feature a camera (200) disposed above the microscope slide (102) and the platform (104) (such that the microscope slide (102) and the platform (104) are positioned in a field of view of the camera), a processor (202) operatively coupled to the camera (200) and the slide alignment device (204), and a memory (201) operatively coupled to the processor (202). In some embodiments, the camera is configured to capture an image of the microscope slide (102) and the platform (104) to produce a captured image. The captured image is processed to produce an inverse grayscale version ("digital image").

The memory (201) may be operatively coupled to the processor (202) and configured to store digitally-encoded instructions that, when executed by the processor (202), cause the processor (202) to perform operations comprising the steps detailed in any of Case 1, 2, or 3. In further embodiments, if a misalignment is detected, the processor (202) can command the slide alignment device (204) to engage the microscopic slide (102) at the one or more contact points, move the slide, and release the slide in another position on the platform (104).

The system can repeat the steps if a misalignment between the microscope slide (102) and the platform (104) is detected. For example, the system can repeated the operations comprising capturing an image, acquiring an inverse grayscale version ("digital image"), performing the steps detailed in any of Case 1, 2, or 3, and moving the slide until the system detects that the microscopic slide (102) and platform (104) are aligned.

Slide processing systems comprising the slide alignment device(204) may include a variety of stations (platforms) whose translation may be simplified by a transport mechanism, such as those described in U.S. Patent Application Publication No. 2015/0323776 entitled "Specimen Processing Systems and Methods For Holding Slides", the specifications of which are incorporated herein by reference. In some embodiments, the transfer mechanism can include, without limitation, one or more robotic handlers or arms, X-Y-Z transport systems, conveyors, or other automated mechanisms capable of carrying items between locations. In other embodiments, the transfer mechanism includes one or more end effectors, grippers, suction devices, holders, clamps, or other components suitable for gripping the slide carrier.

In other embodiments, the slide alignment device (204) may comprise a mechanical handler or arm. The slide alignment device (204) may further comprise a gripping component for engaging the microscopic slide (102) at the one or more contact point, where the gripping component can include, without limitation, one or more suction devices (e.g., suction cups, pumps, vacuum pumps, etc.), mechanical grippers (e.g., jaws, clamps, pinchers, magnets, etc.), or other retention features that, for example, prevent dropping of the slide. For example, the gripping component can include a vacuum port for which a vacuum source can provide suction at the vacuum port via supply line that is capable of picking up the slide and holding the slide during further transport. Sensors (e.g., pressure sensors, air pressure sensors, light sensors, etc.) can be provided to detect the presence of the slide retained by the gripping component.

In further embodiments, the transport mechanism can operate via a single motion point, such as a leadscrew connected to a motor (or a slide mechanism) which translates between a first and second position to provide accurate placement of the microscope slide. Some implementations relate to a transport system including: a translating member, two or more sample carrier retaining devices attached to the translating member at a fixed, equal spacing between adjacent sample carrier devices, and a movement mechanism connected to the translating member to move the translating member and the attached sample carrier retaining device back and forth between a first and second position.

At least some embodiments include a specimen processing system comprising a slide ejector assembly for removing slides from a slide carrier. The slide ejector assembly includes a slide staging device and an actuator assembly. The slide staging device includes the platform and the slide alignment device. The actuator assembly includes a slide ejector positioned to move relative to the slide carrier to transfer individual slides from the slide carrier to the platform. The slides can thus be transferred to the platform without the use of, for example, mechanical gripper or suction cup devices that pull slides from one location to another location.

Implementations of the sample transport systems can include any one or more of the following features, individually or in combination. The sample carrier can include one or more of a metal glass, ceramic or plastic (e.g. the glass microscope slide). At least one of the sample carrier retaining devices can be moved and controlled by the translating member to transport the sample carrier to a specific station in a proper orientation to retain or release the sample carrier to a specific location at a station, where the proper orientation of the sample carrier can be achieved by rotating at least the retainer portion as the sample carrier retaining device moves towards the specific station, and where the proper orientation of the sample carrier can be achieved by rotating at least the sample retainer portion horizontally to a specific angle from 90 to 180 degrees. The retainer portions can include a vacuum cup, an adhesive material, an electromagnet, or mechanical device configured to hold a sample carrier.

Other non-limiting examples of said slide processing systems that may be utilized herewith are described in WO2013016035 entitled "Sample transport systems and methods", and U.S. Pat. No. 8,883,509 entitled "Apparatus and Method for Biological Sample Processing" and granted on Nov. 11, 2014, the specifications of which are incorporated herein by reference.

Further Particular Embodiments

Further embodiment 1—A method for detecting, in a digital image, a misalignment between a microscope slide (102) and a platform (104) upon which the microscope slide (102) is disposed, wherein the digital image is divided into four quadrants, wherein the four quadrants are a top left quadrant, a top right quadrant, a bottom left quadrant, and a bottom right quadrant, wherein the platform (104) has a horizontal edge (106) and a vertical edge (108) wherein the microscope slide (102) has a slide horizontal edge (112) and a slide vertical edge (114) that connect to form a right-angled corner (116), wherein the method comprises: obtaining the digital image by acquiring an inverse grayscale version of an RGB image of the microscope slide (102) and the platform (104); (b) identifying a location of a diagonal line segment (110) that joins the horizontal edge (106) and the vertical edge (108) of the platform (104), wherein a length of the diagonal line segment (110) is known, wherein an angle, $\theta$, between the diagonal line segment (110) and a positive x-axis of an x-y coordinate plane measures 135 degrees, wherein identifying the location of the diagonal line (110) segment comprises: generating a first set of potential line segments, wherein an angle between each potential line segment and the positive x-axis measures 135 degrees, wherein a length of each potential line segment is the length of the diagonal line segment (110), wherein the set of potential line segments are located in the top right quadrant of the digital image (100); and calculating a first cost function for each potential line segment, wherein each potential line segment comprises a set of pixels, wherein each pixel of the set of pixels has a magnitude; wherein the first cost function is an average magnitude of the potential line segment pixels and immediate off diagonal pixels divided by a sum of a standard deviation of the potential line segment pixels and immediate off diagonal pixels and 0.0001, wherein immediate off diagonal pixels are pixels either one pixel above or one pixel below each potential line segment, wherein the diagonal line segment is comprised of a set of pixels having magnitudes approximately equal in value and higher than magnitudes of surrounding pixels, wherein the set of pixels comprising an optimal potential line segment have an average magnitude higher than magnitudes of surrounding pixels and a near-zero standard deviation; and selecting the potential line segment that yields a highest value of the first cost function thereby identifying the location of the diagonal line segment (110), wherein identifying the location of the diagonal line segment (110) provides two reference points in the digital image effective for locating the horizontal edge (106) of the platform (104), the vertical edge (108) of the platform (104), the slide horizontal edge (112) and the slide vertical edge (114), wherein the two reference points are a left-most location (118) and a right-most location (120) of the diagonal line segment (110); (c) locating the vertical edge (108) of the platform (104), comprising: (i) obtaining a transposed version of the top right quadrant of the digital image (100); (ii) generating a second set of potential line segments, each potential line segment having a slope within a range of −0.1 to 0.1, wherein the set of potential line segments are located within a first window of the transposed version of the top right quadrant of the digital image, the first window comprising columns of thirty pixels beginning at the right-most location (120) of the diagonal line segment (110) and extending upwards, and rows of pixels beginning from the right-most location (120) of the diagonal line segment (110) and extending (to the right) to an end of the transposed version of the top right quadrant of the digital image (100); (iii) calculating a second cost function for each potential line segment, wherein each potential line segment comprises a set of pixels, wherein each pixel of the set of pixels has a magnitude greater than a cutoff magnitude, wherein the second cost function is the average of the magnitudes of each pixel divided by the sum of the standard deviation of the set of pixels and 0.0001; and (iv) selecting the potential line segment that yields a highest value of the second cost function thereby identifying the location of the vertical edge (108) of the platform (104); (d) locating the slide vertical edge (114), wherein the corner (116) of the microscope slide (102) extends beyond the diagonal line segment (110) of the platform, wherein locating the slide vertical edge (114) comprises: (i) generating a third set of potential line segments within the transposed version of the top right quadrant of the digital image (100), wherein each potential line segment has a slope within a range of −0.2 to 0.2, wherein the set of potential line segments are located within a second window within the transposed version of the top right quadrant of the digital image, the second window comprising columns of pixels beginning 10 pixels above the right most location (120) of the diagonal line segment (110) and extending 250 pixels above the right-most location (120) of the diagonal line segment (110) and all rows of pixels in the transposed version of the top right quadrant of the digital image; (ii) calculating a third cost function for each potential line segment, wherein each potential line segment comprises a set of pixels, wherein each pixel of the set of pixels has a magnitude greater than the cutoff magnitude, wherein the third cost function is the average of the magnitudes of each pixel divided by the sum of the standard deviation of the set of pixels and 0.0001; and (iii) selecting the potential line segment that yields a highest value of the third cost function thereby identifying the location of the slide vertical edge (114); (e) locating the horizontal edge (106) of the platform (104) in the original digital image, comprising: (i) generating a fourth set of potential line segments, each potential line segment having a slope within a range of −0.1 to 0.1, wherein the set of potential line segments are located within a third window, the third window comprising rows of pixels within 30 pixels above the left-most location (118) of the diagonal line segment (110), and all columns of pixels in the top right quadrant of the original digital image (100); (ii) calculating a fourth cost function for each potential line segment, wherein each potential line segment comprises a set of pixels, wherein each pixel of the set of pixels has a magnitude greater than the cutoff magnitude, wherein the fourth cost function is the average of the magnitudes of each pixel divided by the sum of the standard deviation of the set of pixels and 0.0001; and (iii) selecting the potential line segment that yields a highest value of the fourth cost function thereby identifying the location of the horizontal edge (106) of the platform (104); (f) locating the slide horizontal edge (112) in the original digital image, comprising: (i) generating a fifth set of potential line segments, each potential line segment having a slope within a range of −0.2 to 0.2, wherein the fifth set of potential line segments are located within a fourth window, the fourth window comprising rows within 33 pixels to 250 pixels above the left-most location (118) of the diagonal line segment (110), and all columns in the top right quadrant of the original digital image (100); (ii) calculating a fifth cost function for each potential line segment, wherein each potential line segment comprises a set of pixels, wherein each pixel of the set of pixels has a magnitude greater than the cutoff magnitude, wherein the fifth cost function is the average of the magnitudes of each pixel divided by the sum of the standard deviation of the set of pixels and 0.0001; and (iii) selecting the potential line segment that yields a highest value of the fifth cost function thereby identifying the slide horizontal edge (112); (g) calculating a value of a first distance, wherein the value of the first distance is a shortest horizontal distance between the vertical edge (108) of the platform (104) and the slide vertical edge (114); and (h) calculating a value of a second distance, wherein the value of the second distance is a shortest vertical distance between the horizontal edge (106) of the platform (104) and the slide horizontal edge (112); wherein if the value of the first distance is greater than a first threshold maximum value or smaller than a first threshold minimum value then a misalignment between the microscope slide (102) and the platform (104) is detected, wherein if the value of the second distance is greater than a second threshold maximum value or smaller than a second threshold minimum value then a misalignment between the microscope slide (102) and the platform (104) is detected.

Further embodiment 2—The method of further embodiment 1, wherein a left-most location (118) of the diagonal line segment is located within rows 25% to 50% from a top row of the digital image and within columns 55% to 83% from a left-most column of the top right quadrant of the digital image (100).

Further embodiment 3—The method of either of further embodiment 1 and further embodiment 2, wherein one or more predetermined values of the cutoff magnitudes are used to determine the set of potential line segments.

Further embodiment 4—A method for detecting, in a digital image, a misalignment between a microscope slide (102) and a platform upon which the microscope slide (102) is disposed, wherein the digital image is divided into four quadrants, wherein the four quadrants are a top left quadrant, a top right quadrant, a bottom left quadrant, and a bottom right quadrant, wherein the platform (104) has a horizontal edge (106) and a vertical edge (108) wherein the microscope slide (102) has a slide horizontal edge (112) and a slide vertical edge (114) that connect to form a right-angled corner (116), wherein the method comprises: (a) obtaining the digital image by acquiring an inverse grayscale version of an RGB image of the microscope slide (102) and the platform (104); (b) identifying a location of a diagonal line segment (110) that joins the horizontal edge (106) and the vertical edge (108) of the platform (104), wherein the diagonal line segment (110) has a length L, wherein a reference angle, θ, is measured between the diagonal line segment (110) and a positive x-axis of an x-y coordinate plane, wherein identifying the location of the diagonal line segment comprises: (i) generating a plurality of potential line segments each having a length equal to L and a reference angle equal to θ, wherein each potential line segment is defined by a center pixel; (ii) superimposing the center pixel of each potential line segment on each pixel of a plurality of pixels comprising the top right quadrant of the digital image; (iii) calculating a first cost function for each potential line segment for each pixel in the top right quadrant of the digital image (100), wherein each potential line segment is comprised of a set of pixels, wherein each pixel of the set of pixels has a magnitude, wherein the first cost function is an average magnitude of the potential line segment pixels and immediate off diagonal pixels divided by a sum of a standard deviation of the potential line segment pixels and immediate off diagonal pixels and 0.0001, wherein immediate off diagonal pixels are pixels either one pixel above or one pixel below each potential line segment, wherein the diagonal line segment is comprised of a set of pixels having magnitudes approximately equal in value and higher than magnitudes of surrounding pixels, wherein the set of pixels comprising an optimal potential line segment have an average magnitude higher than magnitudes of surrounding pixels and a near-zero standard deviation; and (iv) selecting the potential line segment that yields a highest value of the first cost function thereby identifying the location of the diagonal line segment (110), wherein identifying the location of the diagonal line segment (110) provides two reference points in the digital image effective for locating the horizontal edge (106) of the platform (104), the vertical edge (108) of the platform (104), the slide horizontal edge (112) and the slide vertical edge (114), wherein the two reference points are a left-most location (118) and a right-most location (120) of the diagonal line segment; (c) locating the vertical edge (108) of the platform (104), comprising: (i) obtaining a transposed version of the top right quadrant of the digital image (100); (ii) generating a first set of potential line segments, each potential line segment having a slope within a range of −0.1 to 0.1, wherein the set of potential line segments are located within a first window, the first window comprising columns of pixels beginning at the right-most location (120) of the diagonal line segment (110) and extending upwards to a top of the transposed version of the top right quadrant and all rows of pixels in the transposed version of the top right quadrant; and (iii) calculating a second cost function for each potential line segment, wherein each potential line segment comprises a set of pixels, wherein each pixel of the set of pixels has a magnitude greater than a cutoff magnitude, wherein the second cost function is the average of the magnitudes of each pixel divided by the sum of the standard deviation of the set of pixels and 0.0001; and (iv) selecting the potential line segment that yields a highest value of the second cost function thereby identifying the location of the vertical edge (108) of the platform (104); (d) locating the slide vertical edge (114), wherein the corner (116) of the microscope slide (102) extends beyond the diagonal line segment (110) of the platform, wherein locating the slide vertical edge (114) comprises: (i) generating a second set of potential line segments within the transposed version of the top right quadrant of the digital image (100), wherein each potential line segment has a slope within a range of −0.2 to 0.2, wherein the set of potential line segments are located within a second window comprising columns of pixels of the transposed digital image beginning ten pixels above the right-most location (120) of the diagonal line segment (110) extending upwards to a top of the transposed version of the top right quadrant and all rows of pixels in the transposed version of the top right quadrant; and (ii) calculating a third cost function for each potential line segment, wherein each potential line segment comprises a set of pixels, wherein each pixel of the set of pixels has a magnitude greater than a cutoff magnitude, wherein the third cost function is the average of the magnitudes of each pixel divided by the sum of the standard deviation of the set of pixels and 0.0001; (iii) selecting the potential line segment that yields a highest value of the third cost function thereby identifying the location of the slide vertical edge (114); (e) locating the horizontal edge (106) of the platform (104) in the original digital image, comprising: (i) generating a third set of potential line segments, each potential line segment having a slope within a range of −0.1 to 0.1, wherein the set of potential line segments are located within a third window, the third window comprising columns of pixels beginning at the left-most location (118) of the diagonal line segment (110) and extending upwards to a first row of the original digital image, and all rows of pixels in the top right quadrant of the original digital image (100); (ii) calculating a fourth cost function for each potential line segment, wherein each potential line segment comprises a set of pixels, wherein each pixel of the set of pixels has a magnitude greater than a cutoff magnitude, wherein the fourth cost function is the average of the magnitudes of each pixel divided by the sum of the standard deviation of the set of pixels and 0.0001; and (iii) selecting the potential line segment that yields a highest value of the fourth cost function thereby identifying the location of the horizontal edge (106) of the platform (104); (f) locating the slide horizontal edge (112) in the original digital image, comprising: (i) generating a fourth set of potential line segments, each potential line segment having a slope within a range of −0.2 to 0.2, wherein the set of potential line segments are located within a fourth window, the fourth window comprising columns of pixels beginning ten pixels above the left-most location (118) of the diagonal line segment (110) and extending upwards to a first row of the original digital image, and all rows of pixels in the top right quadrant of the original digital image (100); (ii) calculating a fifth cost function for each potential line segment, wherein each potential line segment comprises a set of pixels, wherein each pixel of the set of pixels has a magnitude greater than a cutoff magnitude, wherein the fifth cost function is the average of the magnitudes of each pixel divided by the sum of the standard deviation of the set of pixels and 0.0001; and (iii) selecting the potential line segment that yields a highest value of the fifth cost function thereby identifying the slide horizontal edge (112); (g) calculating a value of a first distance, wherein the value of the first distance is a shortest horizontal distance between the vertical edge (108) of the platform (104) and the slide vertical edge (114); and (h) calculating a value of a second distance, wherein the value of the second distance is a shortest vertical distance between the horizontal edge (106) of the platform (104) and the slide horizontal edge (112); wherein if the value of the first distance is greater than a first threshold maximum value or smaller than a first threshold minimum value then a misalignment between the microscope slide (102) and the platform (104) is detected, wherein if the value of the second distance is greater than a second threshold maximum value or smaller than a first threshold minimum value then a misalignment between the microscope slide (102) and the platform (104) is detected.

Further embodiment 5—the method of further embodiment 4, wherein the value of L is within a predetermined range.

Further embodiment 6—the method of further embodiment 5 or further embodiment 6, wherein the value of 0 is within a predetermined range.

Further embodiment 7—the method of any one of further embodiments 4, 5 or 6, wherein the cutoff magnitude comprises one or more predetermined values.

Further embodiment 8—a method for detecting, in a digital image, a misalignment between a microscope slide (102) and a platform upon which the microscope slide (102) is disposed, wherein the digital image is divided into four quadrants, wherein the four quadrants are a top left quadrant, a top right quadrant, a bottom left quadrant, and a bottom right quadrant, wherein the platform (104) has a horizontal edge (106) and a vertical edge (108) wherein the microscope slide (102) has a slide horizontal edge (112) and a slide vertical edge (114) that connect to form a right-angled corner (116), the method comprises: (a) obtaining the digital image by acquiring an inverse grayscale version of an RGB image of the microscope slide (102) and the platform (104); (b) identifying a location of a reference line pattern (110) that connects the horizontal edge (106) and the vertical edge (108) of the platform (104), wherein the reference line pattern has a predetermined length and a parametric form, wherein the parametric form is an equation having one or more unknown coefficients that define a shape of the reference line pattern, wherein identifying the location of the reference line pattern (110) comprises: (i) generating a set of potential reference line patterns by varying the one or more unknown coefficients within a determined range, each potential reference line pattern having the length and the parametric form of the reference line pattern (110), wherein each potential reference line pattern is defined by a center pixel; (ii) superimposing the center pixel of each potential reference line pattern on each pixel of a plurality of pixels comprising the top right quadrant of the digital image (100); (iii) calculating a first cost function for each potential reference line pattern for each pixel in the top right quadrant of the digital image (100), wherein each potential reference line pattern is comprised of a set of pixels, wherein each pixel of the set of pixels has a magnitude, wherein the first cost function is an average magnitude of the reference line pattern pixels and immediate off diagonal pixels divided by a sum of a standard deviation of the reference line pattern pixels and immediate off diagonal pixels and 0.0001, wherein immediate off diagonal pixels are pixels either one pixel above or one pixel below each reference line pattern, wherein the reference line pattern is comprised of a set of pixels having magnitudes approximately equal in value and higher than magnitudes of surrounding pixels, wherein the set of pixels comprising an optimal potential reference line pattern has an average magnitude higher than magnitudes of surrounding pixels and a near-zero standard deviation; and (iv) selecting the potential reference line pattern that yields a highest value of the first cost function thereby identifying the location of the reference line pattern (110), wherein identifying the location of the reference line pattern (110) provides two reference points in the digital image effective for locating the horizontal edge (106) of the platform (104), the vertical edge (108) of the platform (104), the slide horizontal edge (112) and the slide vertical edge (114), wherein the two reference points are a left-most location (118) and a right-most location (120) of the reference line pattern; (c) locating the vertical edge (108) of the platform (104), comprising: (i) obtaining a transposed version of the top right quadrant of the digital image (100); (ii) generating a first set of potential line segments, each potential line segment having a slope within a range of −0.1 to 0.1, wherein the set of potential line segments are located within a first window, the first window comprising columns of pixels beginning at the right-most location (120) of the reference line pattern (110) and extending upwards to a top of the transposed version of the top right quadrant and all rows of pixels in the transposed version of the top right quadrant; (iii) calculating a second cost function for each potential line segment, wherein each potential line segment comprises a set of pixels, wherein each pixel of the set of pixels has a magnitude greater than a cutoff magnitude, wherein the second cost function is a function of an average of the magnitudes of each pixel and a standard deviation of the set of pixels; and (iv) selecting the potential line segment that yields a highest value of the second cost function thereby identifying the location of the vertical edge (108) of the platform (104); (d) identifying a location of the slide vertical edge (114), wherein the corner (116) of the microscope slide (102) extends beyond the reference line pattern (110) of the platform (104), wherein locating the slide vertical edge (114) comprises: (i) generating a second set of potential line segments within the transposed version of the top right quadrant of the digital image (100), wherein each potential line segment has a slope within a range of −0.2 to 0.2, wherein the set of potential line segments are located within a second window comprising columns of pixels of the transposed digital image beginning ten pixels above the right-most location (120) of the reference line pattern (110) extending upwards to a top of the transposed version of the top right quadrant and all rows of pixels in the transposed version of the top right quadrant; and (ii) calculating a third cost function for each potential line segment, wherein each potential line segment comprises a set of pixels, wherein each pixel of the set of pixels has a magnitude greater than the cutoff magnitude, wherein the third cost function is a function of an average of the magnitudes of each pixel and a standard deviation of the set of pixels; (iii) selecting the potential line segment that yields a highest value of the third cost function thereby identifying the location of the slide vertical edge (114); (e) locating the horizontal edge (106) of the platform (104) in the original digital image, comprising: (i) generating a third set of potential line segments, each potential line segment having a slope within a range of −0.1 to 0.1, wherein the set of potential line segments are located within a third window, the third window comprising columns of pixels beginning at the left-most location (118) of the reference line pattern (110) and extending upwards to a first row of the original digital image, and all rows of pixels in the top right quadrant of the original digital image (100); (ii) calculating a fourth cost function for each potential line segment, wherein each potential line segment comprises a set of pixels, wherein each pixel of the set of pixels has a magnitude greater than the cutoff magnitude, wherein the fourth cost function is a function of an average of the magnitudes of each pixel and a standard deviation of the set of pixels; and (iii) selecting the potential line segment that yields a highest value of the fourth cost function thereby identifying the location of the horizontal edge (106) of the platform (104); (f) locating the slide horizontal edge (112) in the original digital image, comprising: (i) generating a fourth set of potential line segments, each potential line segment having a slope within a range of −0.2 to 0.2, wherein the set of potential line segments are located within a fourth window, the fourth window comprising columns of pixels beginning ten pixels above the left-most location (118) of the reference line pattern (110) and extending upwards to a first row of the original digital image, and all rows of pixels in the top right quadrant of the original digital image (100); (ii) calculating a fifth cost function for each potential line segment, wherein each potential line segment comprises a set of pixels, wherein each pixel of the set of pixels has a magnitude greater than the cutoff magnitude, wherein the fifth cost function is a function of an average of the magnitudes of each pixel and a standard deviation of the set of pixels; and (iii) selecting the potential line segment that yields a highest value of the fifth cost function thereby identifying the slide horizontal edge (112); (g) calculating a value of a first distance, wherein the value of the first distance is a shortest horizontal distance between the vertical edge (108) of the platform (104) and the slide vertical edge (114); and (h) calculating a value of a second distance, wherein value of the second distance is a shortest vertical distance between the horizontal edge (106) of the platform (104) and the slide horizontal edge (112); wherein if the value of the first distance is greater than a first threshold maximum value or smaller than a first threshold minimum value then a misalignment between the microscope slide (102) and the platform (104) is detected, wherein if the value of the second distance is greater than a second threshold maximum value or smaller than a first threshold minimum value then a misalignment between the microscope slide (102) and the platform (104) is detected.

Further embodiment 9—the method of further embodiment 8, wherein the reference line pattern (110) is linear having a parametric form: y=ax+b.

Further embodiment 10—the method of either of further embodiment 8 or further embodiment 9, wherein reference line pattern (110) is a curve having a parametric form: y=ax2+bx+c.

Further embodiment 11—an image analysis system for detecting, in a digital image, a misalignment between a microscope slide (102) and a platform (104) upon which the microscope slide (102) is disposed, said system comprising: a slide processing station comprising the platform (104); a camera (200) disposed above the microscope slide (102) and the platform (104) such that the microscope slide (102) and the platform (104) are positioned in a field of view of the camera; a processor (202) operatively coupled to the camera (200); and a memory (201) operatively coupled to the processor (202), configured to store digitally-encoded instructions that, when executed by the processor (202), cause the processor (202) to perform operations comprising: (i) capturing an image of the microscope slide (102) and the platform (104) upon which the microscope slide (102) is disposed with the camera (200) to produce a captured image, wherein the platform (104) has a horizontal edge (106) and a vertical edge (108) wherein the microscope slide (102) has a slide horizontal edge (112) and a slide vertical edge (114) that connect to form a right-angled corner (116); (ii) acquiring an inverse grayscale version ("digital image") of the captured image; (iii) identifying a location of a reference line pattern (110) that connects the horizontal edge (106) and the vertical edge (108) of the platform (104), wherein the reference line pattern has a predetermined length and a parametric form, wherein the parametric form is an equation having one or more unknown coefficients that define a shape of the reference line pattern, wherein identifying the location of the reference line pattern (110) comprises: (A) generating a set of potential reference line patterns by varying the one or more unknown coefficients within a determined range, each potential reference line pattern having the length and the parametric form of the reference line pattern (110), wherein each potential reference line pattern is defined by a center pixel; (B) superimposing the center pixel of each potential reference line pattern on each pixel of a plurality of pixels comprising the top right quadrant of the digital image (100); (C) calculating a first cost function for each potential reference line pattern for each pixel in the top right quadrant of the digital image (100), wherein each potential reference line pattern is comprised of a set of pixels, wherein each pixel of the set of pixels has a magnitude, wherein the first cost function is an average magnitude of the reference line pattern pixels and immediate off diagonal pixels divided by a sum of a standard deviation of the reference line pattern pixels and immediate off diagonal pixels and 0.0001, wherein immediate off diagonal pixels are pixels either one pixel above or one pixel below each reference line pattern, wherein the reference line pattern is comprised of a set of pixels having magnitudes approximately equal in value and higher than magnitudes of surrounding pixels, wherein the set of pixels comprising an optimal potential reference line pattern has an average magnitude higher than magnitudes of surrounding pixels and a near-zero standard deviation; and (D) selecting the potential reference line pattern that yields a highest value of the first cost function thereby identifying the location of the reference line pattern (110), wherein identifying the location of the reference line pattern (110) provides two reference points in the digital image effective for locating the horizontal edge (106) of the platform (104), the vertical edge (108) of the platform (104), the slide horizontal edge (112) and the slide vertical edge (114), wherein the two reference points are a left-most location (118) and a right-most location (120) of the reference line pattern; (iv) locating the vertical edge (108) of the platform (104), comprising: (A) obtaining a transposed version of the top right quadrant of the digital image (100); (B) generating a first set of potential line segments, each potential line segment having a slope within a range of −0.1 to 0.1, wherein the set of potential line segments are located within a first window, the first window comprising columns of pixels beginning at the right-most location (120) of the reference line pattern (110) and extending upwards to a top of the transposed version of the top right quadrant and all rows of pixels in the transposed version of the top right quadrant; (C) calculating a second cost function for each potential line segment, wherein each potential line segment comprises a set of pixels, wherein each pixel of the set of pixels has a magnitude greater than a cutoff magnitude, wherein the second cost function is a function of an average of the magnitudes of each pixel and a standard deviation of the set of pixels; and (D) selecting the potential line segment that yields a highest value of the second cost function thereby identifying the location of the vertical edge (108) of the platform (104); (v) identifying a location of the slide vertical edge (114), wherein the corner (116) of the microscope slide (102) extends beyond the reference line pattern (110) of the platform (104), wherein locating the slide vertical edge (114) comprises: (A) generating a second set of potential line segments within the transposed version of the top right quadrant of the digital image (100); wherein each potential line segment has a slope within a range of −0.2 to 0.2, wherein the set of potential line segments are located within a second window comprising columns of pixels of the transposed digital image beginning ten pixels above the right-most location (120) of the reference line pattern (110) extending upwards to a top of the transposed version of the top right quadrant and all rows of pixels in the transposed version of the top right quadrant; and (B) calculating a third cost function for each potential line segment, wherein each potential line segment comprises a set of pixels, wherein each pixel of the set of pixels has a magnitude greater than the cutoff magnitude, wherein the third cost function is a function of an average of the magnitudes of each pixel and a standard deviation of the set of pixels; and (C) selecting the potential line segment that yields a highest value of the third cost function thereby identifying the location of the slide vertical edge (114); (vi) locating the horizontal edge (106) of the platform (104) in the original digital image, comprising: (A) generating a third set of potential line segments, each potential line segment having a slope within a range of −0.1 to 0.1, wherein the set of potential line segments are located within a third window, the third window comprising columns of pixels beginning at the left-most location (118) of the reference line pattern (110) and extending upwards to a first row of the original digital image, and all rows of pixels in the top right quadrant of the original digital image (100); (B) calculating a fourth cost function for each potential line segment, wherein each potential line segment comprises a set of pixels, wherein each pixel of the set of pixels has a magnitude greater than the cutoff magnitude, wherein the fourth cost function is a function of an average of the magnitudes of each pixel and a standard deviation of the set of pixels; and (C) selecting the potential line segment that yields a highest value of the fourth cost function thereby identifying the location of the horizontal edge (106) of the platform (104); (vii) locating the slide horizontal edge (112) in the original digital image, comprising: (A) generating a fourth set of potential line segments, each potential line segment having a slope within a range of −0.2 to 0.2, wherein the set of potential line segments are located within a fourth window, the fourth window comprising columns of pixels beginning ten pixels above the left-most location (118) of the reference line pattern (110) and extending upwards to a first row of the original digital image, and all rows of pixels in the top right quadrant of the original digital image (100); (B) calculating a fifth cost function for each potential line segment, wherein each potential line segment comprises a set of pixels, wherein each pixel of the set of pixels has a magnitude greater than the cutoff magnitude, wherein the fifth cost function is a function of an average of the magnitudes of each pixel and a standard deviation of the set of pixels; (C) selecting the potential line segment that yields a highest value of the fifth cost function thereby identifying the slide horizontal edge (112); and (D) calculating a value of a first distance, wherein the value of the first distance is a shortest horizontal distance between the vertical edge (108) of the platform (104) and the slide vertical edge (114); and (viii) calculating a value of a second distance, wherein value of the second distance is a shortest vertical distance between the horizontal edge (106) of the platform (104) and the slide horizontal edge (112); wherein if the value of the first distance is greater than a first threshold maximum value or smaller than a first threshold minimum value then a misalignment between the microscope slide (102) and the platform (104) is detected, wherein if the value of the second distance is greater than a second threshold maximum value or smaller than a first threshold minimum value then a misalignment between the microscope slide (102) and the platform (104) is detected.

Further embodiment 12—An image analysis system for detecting, in a digital image, a misalignment between a microscope slide (102) and a platform (104) upon which the microscope slide (102) is disposed, said system comprising: the platform (104) configured to receive the microscopic slide (102); a slide alignment device (204) configured to engage the microscopic slide (102) at one or more contact points for moving the microscopic slide (102) on the platform (104); a camera (200) disposed above the microscope slide (102) and the platform (104) such that the microscope slide (102) and the platform (104) are positioned in a field of view of the camera; a processor (202) operatively coupled to the camera (200) and the slide alignment device (204); and a memory (201) operatively coupled to the processor (202), configured to store digitally-encoded instructions that, when executed by the processor (202), cause the processor (202) to perform operations comprising: (i) capturing an image of the microscope slide (102) and the platform (104) upon which the microscope slide (102) is disposed with the camera (200) to produce a captured image, wherein the platform (104) has a horizontal edge (106) and a vertical edge (108) wherein the microscope slide (102) has a slide horizontal edge (112) and a slide vertical edge (114) that connect to form a right-angled corner (116); (ii) acquiring an inverse grayscale version ("digital image") of the captured image; (iii) identifying a location of a reference line pattern (110) that connects the horizontal edge (106) and the vertical edge (108) of the platform (104), wherein the reference line pattern has a predetermined length and a parametric form, wherein the parametric form is an equation having one or more unknown coefficients that define a shape of the reference line pattern, wherein identifying the location of the reference line pattern (110) comprises: (A) generating a set of potential reference line patterns by varying the one or more unknown coefficients within a determined range, each potential reference line pattern having the length and the parametric form of the reference line pattern (110), wherein each potential reference line pattern is defined by a center pixel; (B) superimposing the center pixel of each potential reference line pattern on each pixel of a plurality of pixels comprising the top right quadrant of the digital image (100); (C) calculating a first cost function for each potential reference line pattern for each pixel in the top right quadrant of the digital image (100), wherein each potential reference line pattern is comprised of a set of pixels, wherein each pixel of the set of pixels has a magnitude, wherein the first cost function is an average magnitude of the reference line pattern pixels and immediate off diagonal pixels divided by a sum of a standard deviation of the reference line pattern pixels and immediate off diagonal pixels and 0.0001, wherein immediate off diagonal pixels are pixels either one pixel above or one pixel below each reference line pattern, wherein the reference line pattern is comprised of a set of pixels having magnitudes approximately equal in value and higher than magnitudes of surrounding pixels, wherein the set of pixels comprising an optimal potential reference line pattern has an average magnitude higher than magnitudes of surrounding pixels and a near-zero standard deviation; and (D) selecting the potential reference line pattern that yields a highest value of the first cost function thereby identifying the location of the reference line pattern (110), wherein identifying the location of the reference line pattern (110) provides two reference points in the digital image effective for locating the horizontal edge (106) of the platform (104), the vertical edge (108) of the platform (104), the slide horizontal edge (112) and the slide vertical edge (114), wherein the two reference points are a left-most location (118) and a right-most location (120) of the reference line pattern; (iv) locating the vertical edge (108) of the platform (104), comprising: (A) obtaining a transposed version of the top right quadrant of the digital image (100); (B) generating a first set of potential line segments, each potential line segment having a slope within a range of −0.1 to 0.1, wherein the set of potential line segments are located within a first window, the first window comprising columns of pixels beginning at the right-most location (120) of the reference line pattern (110) and extending upwards to a top of the transposed version of the top right quadrant and all rows of pixels in the transposed version of the top right quadrant; (C) calculating a second cost function for each potential line segment, wherein each potential line segment comprises a set of pixels, wherein each pixel of the set of pixels has a magnitude greater than a cutoff magnitude, wherein the second cost function is a function of an average of the magnitudes of each pixel and a standard deviation of the set of pixels; and (D) selecting the potential line segment that yields a highest value of the second cost function thereby identifying the location of the vertical edge (108) of the platform (104); (v) identifying a location of the slide vertical edge (114), wherein the corner (116) of the microscope slide (102) extends beyond the reference line pattern (110) of the platform (104), wherein locating the slide vertical edge (114) comprises: (A) generating a second set of potential line segments within the transposed version of the top right quadrant of the digital image (100); wherein each potential line segment has a slope within a range of −0.2 to 0.2, wherein the set of potential line segments are located within a second window comprising columns of pixels of the transposed digital image beginning ten pixels above the right-most location (120) of the reference line pattern (110) extending upwards to a top of the transposed version of the top right quadrant and all rows of pixels in the transposed version of the top right quadrant; and (B) calculating a third cost function for each potential line segment, wherein each potential line segment comprises a set of pixels, wherein each pixel of the set of pixels has a magnitude greater than the cutoff magnitude, wherein the third cost function is a function of an average of the magnitudes of each pixel and a standard deviation of the set of pixels; and (C) selecting the potential line segment that yields a highest value of the third cost function thereby identifying the location of the slide vertical edge (114); (vi) locating the horizontal edge (106) of the platform (104) in the original digital image, comprising: (A) generating a third set of potential line segments, each potential line segment having a slope within a range of −0.1 to 0.1, wherein the set of potential line segments are located within a third window, the third window comprising columns of pixels beginning at the left-most location (118) of the reference line pattern (110) and extending upwards to a first row of the original digital image, and all rows of pixels in the top right quadrant of the original digital image (100); (B) calculating a fourth cost function for each potential line segment, wherein each potential line segment comprises a set of pixels, wherein each pixel of the set of pixels has a magnitude greater than the cutoff magnitude, wherein the fourth cost function is a function of an average of the magnitudes of each pixel and a standard deviation of the set of pixels; and (C) selecting the potential line segment that yields a highest value of the fourth cost function thereby identifying the location of the horizontal edge (106) of the platform (104); (vii) locating the slide horizontal edge (112) in the original digital image, comprising: (A) generating a fourth set of potential line segments, each potential line segment having a slope within a range of −0.2 to 0.2, wherein the set of potential line segments are located within a fourth window, the fourth window comprising columns of pixels beginning ten pixels above the left-most location (118) of the reference line pattern (110) and extending upwards to a first row of the original digital image, and all rows of pixels in the top right quadrant of the original digital image (100); (B) calculating a fifth cost function for each potential line segment, wherein each potential line segment comprises a set of pixels, wherein each pixel of the set of pixels has a magnitude greater than the cutoff magnitude, wherein the fifth cost function is a function of an average of the magnitudes of each pixel and a standard deviation of the set of pixels; (C) selecting the potential line segment that yields a highest value of the fifth cost function thereby identifying the slide horizontal edge (112); and (D) calculating a value of a first distance, wherein the value of the first distance is a shortest horizontal distance between the vertical edge (108) of the platform (104) and the slide vertical edge (114); (viii) calculating a value of a second distance, wherein value of the second distance is a shortest vertical distance between the horizontal edge (106) of the platform (104) and the slide horizontal edge (112), wherein if the value of the first distance is greater than a first threshold maximum value or smaller than a first threshold minimum value then a misalignment between the microscope slide (102) and the platform (104) is detected, wherein if the value of the second distance is greater than a second threshold maximum value or smaller than a first threshold minimum value, then a misalignment between the microscope slide (102) and the platform (104) is detected; commanding the slide alignment device (204) to engage the microscopic slide (102) at the one or more contact points and move the slide if the misalignment between the microscope slide (102) and the platform (104) is detected; commanding the slide alignment device (204) to release the microscopic slide (102) on the platform (104); and repeating (i) to (v) if the misalignment between the microscope slide (102) and the platform (104) is detected.

Further embodiment 13—the system of further embodiment 12, wherein the slide alignment device (204) comprises a mechanical arm.

Further embodiment 14—the system of further embodiment 12, wherein the slide alignment device (204) further comprises a gripping component for engaging the microscopic slide (102) at the one or more contact points.

Further embodiment 15—the system of further embodiment 14, wherein the gripping component comprises one or more suction cups or mechanical grippers.

As used herein, the term "about" refers to plus or minus 10% of the referenced number.

As used here, "a," "an," and "the" refer to both the singular and the plural referents unless clearly indicated otherwise. Thus, for example, "a" can refer to one or more, two or more, three or more.

As used herein, the terms "vertical" and "horizontal" refer to directions that correspond to an image frame's x and y axes and are only an indication of the frame of reference within a given image. Thus, for example, if an image was obtained from a different viewpoint, it is possible that what is "vertical" and what is "horizontal" in the image with regard to an external frame of reference could be exchanged.

Various modifications of the invention, in addition to those described herein, will be apparent to those skilled in the art from the foregoing description. For example, while the method and system are illustrated in the context of microscope slides, it is also possible that the method and system could be used to ensure alignment of other substrates. Furthermore, although the examples illustrate the situation where the underlying substrate holder is smaller than the microscope slide, it is also possible to use the method and system in circumstances where substrate is smaller than the substrate holder. Such modifications are also intended to fall within the scope of the appended claims. Each reference cited in the present application is incorporated herein by reference in its entirety.

Although there has been shown and described illustrative embodiments of the disclosed method, it will be readily apparent, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of," and as such the written description requirement for claiming one or more embodiments of the method for detecting slide placement accuracy for medical device instruments using the phrase "consisting of" is met.

The invention claimed is:

1. A method of detecting a misalignment condition between a microscope slide and a platform upon which the microscope slide is disposed, the method comprising:
   (a) identifying, in an image that includes at least a portion of the microscope slide and at least a portion of the platform, a location of a reference line pattern that connects a horizontal edge and a vertical edge of the platform, wherein the reference line has a predetermined length and a parametric form; wherein the identifying of the location of the reference line pattern comprises:
      generating a set of potential reference line patterns by varying one or more unknown coefficients within a predetermined range, wherein each potential reference line pattern has the length and the parametric form of the reference line pattern, wherein each potential reference line pattern is defined by a center pixel;
      superimposing the center pixel of each potential reference line pattern on each pixel of a plurality of pixels comprising a top right quadrant of the image;
      calculating a first cost function for each potential reference line pattern for each pixel in the top right quadrant of the digital image;
      selecting the potential reference line pattern that yields a highest value of the first cost function thereby identifying the location of the reference line pattern;
   (b) identifying, in the image, locations of the platform horizontal edge, the platform vertical edge, a slide horizontal edge, and a slide vertical edge, wherein the identifying of the locations of the platform horizontal edge, the platform vertical edge, the slide horizontal edge, and the slide vertical edge comprises:
      generating a set of potential platform horizontal edge line segments, a set of potential platform vertical edge line segments, a set of potential slide horizontal edge line segments, and a set of potential slide vertical edge line segments, wherein the generated set of potential platform horizontal edge line segments, the generated set of potential platform vertical edge line segments, the generated set of potential slide horizontal edge line segments, and the generated set of potential slide vertical edge segments each have predetermined slope ranges;
      independently computing a cost function for each of the generated sets of potential platform horizontal edge line segments, the generated set of potential platform vertical edge line segments, the generated set of potential slide horizontal edge line segments, and the generated set of potential slide vertical edge line segments; and
      selecting the potential platform horizontal edge line segment, the potential platform vertical edge line segment, the potential slide horizontal edge line segment, and the potential slide vertical edge line segment that yields a highest value of the respective computed cost function as the location of the platform horizontal edge of the platform, the location of the platform vertical edge of the platform, and the location of the slide horizonal edge of the microscope slide;
   (c) calculating a value of a first distance between the first-horizontal edge of the platform and the horizontal edge of the microscope slide in the image and calculating a value of a second distance between the vertical edge of the platform and the vertical edge of the slide in the image, wherein if the value of the first distance or the value of the second distance lies outside a pre-determined range of values, a misalignment condition between the microscope slide and the platform is detected; and
   (d) in response to the detection of the misalignment condition between the microscope slide and the platform, automatically repositioning the microscope slide on the platform using a slide alignment device; and repeating steps (a)-(c) to detect if the misalignment condition is resolved.

2. The method of claim 1, wherein the platform feature comprises a diagonal line segment having a known length.

3. The method of claim 1, wherein the platform feature comprises a diagonal line segment having an unknown length.

4. The method of claim 1, wherein the platform feature comprises a curved line.

5. The method of claim 4, wherein the curved line has a known length.

6. A method of detecting a misalignment condition between a transparent microscope slide and a platform upon which the transparent microscope slide is disposed, the method comprising:
   obtaining through the transparent microscope slide an image of at least a portion of the platform, wherein the at least the portion of the platform comprises a diagonal line segment feature, wherein the diagonal line segment has a known length, and wherein the obtained image further comprises at least a portion of the transparent microscope slide;

identifying the diagonal line segment feature of the platform in the obtained image, wherein the identifying of the diagonal line segment feature of the platform comprises selecting from a first set prospective set of line segments a line segment to represent the diagonal line segment feature of the platform;

identifying in the obtained image, (i) a first edge of the platform, and (ii) a first edge of the transparent microscope slide;

calculating a value of a first distance between the first edge of the platform and the first edge of the transparent microscope slide in the obtained image, wherein if the value of the first distance lies outside a first predetermined range of values, a misalignment condition between the microscope slide and the platform is detected; and in response to the detection of the misalignment condition between the transparent microscope slide and the platform upon which the transparent microscope slide is disposed, automatically repositioning the microscope slide on the platform using a slide alignment device wherein the identification of the diagonal line segment comprises computing a mean and standard deviation for one or more generated windows having an $L \times L$ dimension within the image, and wherein one or more generated windows comprise at least one potential diagonal line and at least one immediate off-diagonal element.

* * * * *